US005275925A

United States Patent [19]

Mihara et al.

[11] Patent Number: 5,275,925

[45] Date of Patent: Jan. 4, 1994

[54] INFRARED-ABSORPTIVE COMPOUND CONTAINING OPTICAL RECORDING MEDIUM

[75] Inventors: Chieko Mihara, Isehara; Hiroyuki Sugata, Yamato; Tsuyoshi Santoh, Yokohama; Tetsuro Fukui, Kawasaki, all of Japan

[73] Assignee: Canon Kabushiki Kaisha, Tokyo, Japan

[21] Appl. No.: 883,198

[22] Filed: May 14, 1992

[30] Foreign Application Priority Data

May 15, 1991 [JP] Japan .................................. 3-138649

[51] Int. Cl.$^5$ ............................ G03C 1/00; B32B 3/02

[52] U.S. Cl. ..................................... 430/495; 430/270; 430/945; 346/135.1

[58] Field of Search ............... 430/270, 271, 495, 945; 548/559, 556, 541; 549/61, 63, 68, 475, 477, 480; 540/1; 346/135.1

[56] References Cited

U.S. PATENT DOCUMENTS

| | | | |
|---|---|---|---|
| 3,251,881 | 5/1966 | Susi et al. | 260/576 |
| 3,484,467 | 12/1969 | Susi et al. | 260/440 |
| 3,575,871 | 4/1971 | Susi et al. | 252/300 |
| 4,511,492 | 4/1985 | Swedo et al. | 528/422 |
| 4,656,121 | 4/1987 | Sato et al. | 430/495 |
| 4,737,444 | 4/1988 | Satoh et al. | 430/271 |
| 4,891,305 | 1/1990 | Oba et al. | 430/495 |
| 4,921,780 | 5/1990 | Oguchi et al. | 430/495 |
| 4,923,390 | 5/1990 | Oguchi et al. | 430/270 |
| 5,009,987 | 4/1991 | Mihara et al. | 430/495 |
| 5,024,917 | 6/1991 | Mihara et al. | 430/271 |
| 5,108,873 | 4/1992 | Fukui et al. | 430/270 |

*Primary Examiner*—Charles L. Bowers, Jr.
*Assistant Examiner*—Martin Angebranndt
*Attorney, Agent, or Firm*—Fitzpatrick, Cella, Harper & Scinto

[57] ABSTRACT

An infrared-absorptive compound represented by the following Formula (I) or (II).

[I]

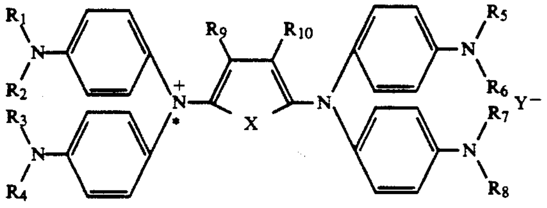

[II]

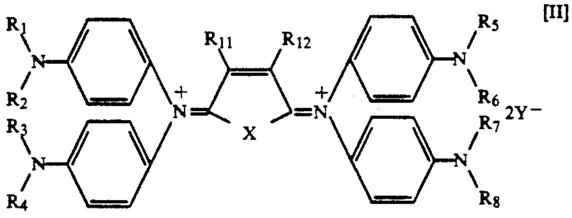

to be contained with an organic coloring matter in the recording layer for providing durable optical recording mediums.

6 Claims, 1 Drawing Sheet

INFRARED-ABSORPTIVE COMPOUND CONTAINING OPTICAL RECORDING MEDIUM

BACKGROUND OF THE INVENTION

1. Field of the Invention

The present invention relates to an infrared-absorptive compound and an optical recording medium comprising a recording layer containing this infrared-absorptive compound.

2. Related Background Art

In general, optical disks and optical cards comprise a substrate and a thin recording layer provided thereon and can record high-density information in the recording layer in which optically detectable small pits (with size of, for example, about 1 μm) are formed along a spiral, circular or linear track(s). To write information in such optical disks or optical cards, the surface of a laser light-sensitive layer is scanned with a converged laser beam so that pits are formed at the points irradiated with this laser beam, along a spiral, circular or linear track(s).

The laser light-sensitive layer is capable of absorbing laser light energy to form optically detectable pits. For example, in a heat mode recording system, the laser light-sensitive layer absorbs heat energy, so that small cavities (pits) can be formed by evaporation or melt at the energy-absorbed area. In another heat mode recording system, absorption of energy of emitted laser light causes the changes in optical density at the energy-absorbed area to form a pit.

A thin film of an organic coloring matter may be used as a recording layer of an optical recording medium so that the optical contrast of recording pits can be set higher. For example, a polymethine type, azulene type, cyanine type or pyrylium type coloring matter having a high absorptivity for the laser light may be used for the thin film, whereby a light-absorptive reflecting film showing a metallic gloss (reflectance: 10 to 50%) can be obtained to give an optical recording medium that enables the recording with laser beam and reading out by reflection. In particular, when a semiconductor laser with an oscillation wavelength of from 600 to 900 nm is used as a laser light source, the apparatus can be made smaller in size and cost. The thin film of organic coloring matter, however, is liable to change with heat and light causing the lowering of recording-reproducing performance and storage stability problems.

In order to prevent the lowering of recording-reproducing performance and storage stability, an optical recording medium has been proposed, as in U.S. Pat. No. 4,656,121, comprising an organic coloring matter thin film in which an infrared-absorptive compound such as an aminium salt or diimonium salt compound is added. Such a conventional aminium salt or diimonium salt compound can prevent the lowering of recording-reproducing performance and storage stability, but there is a problem that the amount of the aminium salt or diimonium salt compound in the thin film of the organic matter is so large that reflectance is lowered resulting in the lowering of the recording sensitivity of the optical recording medium.

The present applicants have already made some proposals in U.S. Pat. Nos. 4,923,390, 5,009,987 and 5,024,917, to solve the above problems in the prior art.

SUMMARY OF THE INVENTION

An object of the present invention is to provide a novel infrared-absorptive compound having a wide absorption range in the infrared region, also having a high absorbance coefficient, and having good solubility.

Another object of the present invention is to provide an optical recording medium remarkably improved in durability in repeated reproduction and light-resisting stability.

The infrared-absorptive compound of the present invention is represented by the following Formula (I) or (II).

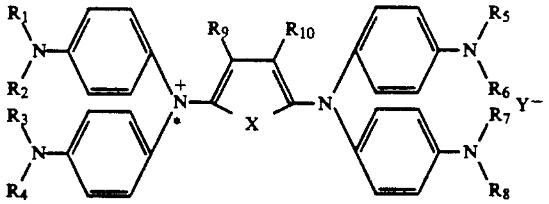

(I)

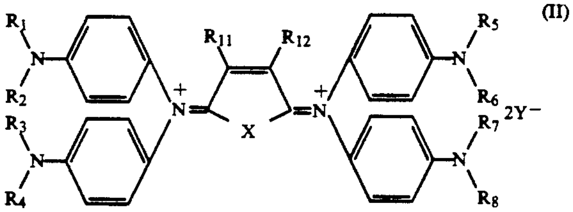

(II)

wherein $R_1$, $R_2$, $R_3$, $R_4$, $R_5$, $R_6$, $R_7$ and $R_8$ may independently represent a hydrogen atom or a monovalent organic residual group; $R_1$ and $R_2$ $R_3$ and $R_4$, $R_5$ and $R_6$, and $R_7$ and $R_8$ may together form a 5-membered, 6-membered or 7-membered ring; $R_9$, $R_{10}$, $R_{11}$ and $R_{12}$ may independently represent a hydrogen atom, an alkyl group, an alkoxyl group, a halogen atom, a hydroxyl group or a cyano group; X represents a sulfur atom, an oxygen atom, a selenium atom, a tellurium atom or $NR_{13}$ wherein N represents a nitrogen atom and $R_{13}$ represents a hydrogen atom or a monovalent organic group; and $Y^-$ represents an anion.

The optical recording medium of the present invention comprises a recording layer at least containing an organic coloring matter and an infrared-absorptive compound described above.

DETAILED DESCRIPTION OF THE PREFERRED EMBODIMENT

Figure 1:
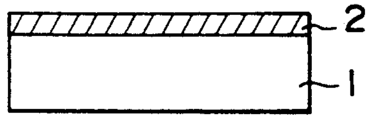
FIG. 1 is a cross-sectional illustration of an example of the optical recording medium according to the present invention.

The infrared-absorptive compound of the present invention is a compound represented by the following Formula (I) or (II).

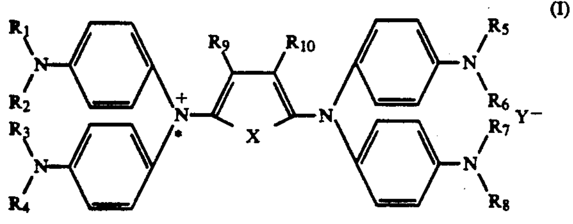

(I)

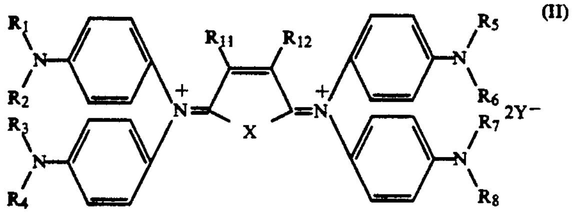

(II)

In the above Formulas (I) and (II), $R_1$, $R_2$, $R_3$, $R_4$, $R_5$, $R_6$, $R_7$ and $R_8$ (hereinafter "$R_1$ to $R_8$") each represent a hydrogen atom or a monovalent organic residual group. The monovalent organic residual group may preferably be exemplified by an alkyl group, an alkenyl group, an aralkyl group, an alkynyl group or an alkoxyalkyl group. In particular, an infrared-absorptive compound with a high solubility for solvents can be obtained when $R_1$ to $R_8$ are selected from an alkoxyalkyl group, an alkenyl group or an alkynyl group.

The alkyl group may preferably be exemplified by a methyl group, an ethyl group, a n-propyl group, an iso-propyl group, a n-butyl group, an iso-butyl group, a t-butyl group, a n-amyl group, a t-amyl group, a n-hexyl group, a n-octyl group or a t-octyl group. Other alkyl group, for example, a substituted alkyl group may preferably be exemplified by a 2-hydroxyethyl group, a 3-hydroxypropyl group, a 4-hydroxybutyl group, a 2-acetoxyethyl group, a carboxymethyl group, a 2-carboxyethyl group a 3-carboxypropyl group, a methoxyethyl group or a methoxypropyl group.

The alkenyl group may preferably be exemplified by a vinyl group, a propenyl group, a butenyl group, a pentenyl group, a hexenyl group, a heptenyl group or an octenyl group.

The aralkyl group may preferably be exemplified by a benzyl group, a p-chlorobenzyl group, a p-methylbenzyl group, a p-phenylmethyl group, a 2-phenylpropyl group, a 3-phenylpropyl group, an $\alpha$-naphthylmethyl group or a $\beta$-naphthylethyl group.

The alkynyl group may preferably be exemplified by a propagyl group, a butynyl group, a pentynyl group or a hexynyl group.

The alkoxyalkyl group may preferably be exemplified by a straight-chain or branched alkoxyalkyl group such as methoxymethyl, 2-methoxyethyl, 3-methoxypropyl, 2-methoxypropyl, 4-methoxybutyl, 3-methoxybutyl, 2-methoxybutyl, 5-methoxypentyl, 4-methoxypentyl, 3-methoxypentyl, 2-methoxypentyl, 6-methoxyhexyl, ethoxymethyl, 2-ethoxyethyl, 3-ethoxypropyl, 2-ethoxypropyl, 4-ethoxybutyl, 3-ethoxybutyl, 5-ethoxypentyl, 4-ethoxypentyl, 6-ethoxyhexyl, propoxymethyl, 2-propoxyethyl, 3-propoxypropyl, 4-propoxybutyl or 5-propoxypentyl.

The organic residual group represented by $R_1$ to $R_8$ may preferably be those having 1 to 8 carbon atoms, and more preferably 2 to 6 carbon atoms.

$R_1$ to $R_8$ may be the same or different one another.

$R_1$ and $R_2$, $R_3$ and $R_4$, $R_5$ and $R_6$, and $R_7$ and $R_8$ each may combine to form an unsubstituted or substituted 5-membered, 6-membered or 7-membered ring. The 5-membered ring may preferably be exemplified by a pyrrolidine ring; the 6-membered ring, a piperidine ring, a morpholine ring or a tetrahydropyridine ring; and the 7-membered ring, a cyclohexylamine ring. The rings formed by combinations between $R_1$ and $R_2$, $R_3$ and $R_4$, $R_5$ and $R_6$, or $R_7$ and $R_8$ may be the same or different one another. A more stable infrared-absorptive compound can be obtained when $R_1$ and $R_2$, $R_3$ and $R_4$, $R_5$ and $R_6$, and $R_7$ and $R_8$ combine to form rings.

$R_9$, $R_{10}$, $R_{11}$ and $R_{12}$ each represent a hydrogen atom, an alkyl group, an alkoxyl group, a halogen atom, a hydroxyl group or a cyano group. The alkyl group or alkoxyl group represented by $R_9$.,$R_{10}$, $R_{11}$ and $R_{12}$ may preferably be those having 1 to 5 carbon atoms, or more preferably 1 to 3 carbon atoms. $R_9$, $R_{10}$, $R_{11}$ and $R_{12}$ may be the same or different one another.

X represents a sulfur atom, an oxygen atom, $NR_{13}$, a selenium atom or a tellurium atom. In $NR_{13}$, N represents a nitrogen atom and $R_{13}$ represents a hydrogen atom or a monovalent organic residual group. The monovalent organic residual group represented by $R_{13}$ is as defined for the monovalent organic residual group represented by $R_1$ to $R_8$ previously described.

$Y^-$ represents an anion as exemplified by a chloride ion, a bromide ion, an iodide ion, a perchlorate ion, a nitrate ion, a benzenesulfonate ion, a p-toluenesulfonate ion, a methylsulfate ion, an ethylsulfate ion, a propylsulfate ion, a tetrafluoroborate ion, a tetraphenylborate ion, a hexafluorophosphate ion, a benzenesulfinate ion, an acetate ion, a trifluoroacetate ion, a propionate ion, a benzoate ion, an oxalate ion, a euccinate ion, a malonate ion, an oleate ion, a stearate ion, a citrate ion, a monohydrogendiphosphate ion, a dihydrogenmonophosphate ion, a pentachlorstannate ion, a chlorosulfonate ion, a fluorosulfonate ion, a trifluoromethanesulfonate ion, a hexanefluoroarsenate ion, a hexanefluoroantimonate ion, a molybdate ion, a tungstate, a titanate ion or a zirconate ion. Of these, a perchlorate ion and a hexanefluoroantimonate ion are preferred.

The infrared-absorptive compound of the present invention can be produced by utilizing the methods disclosed, for example, in U.S. Pat. Nos. 3,251,881, 3,575,871 and 3,484,467 and Japanese Laid-Open Patent Application No. 61-69991. For example, it can be produced according to the following process.

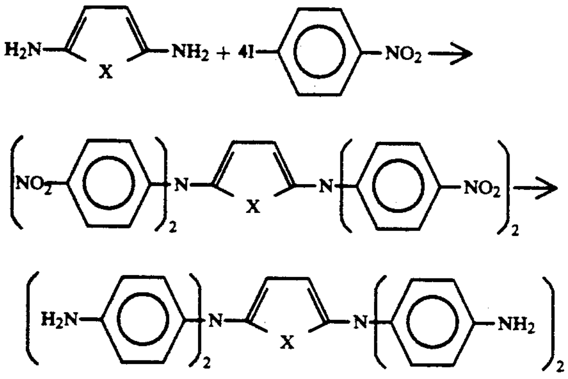

An amino compound obtained by the above Ullmann reaction and reduction is selectively substituted, for example, by alkylation, alkenylation, aralkylation or alkynylation followed by oxidation, so that the infrared-absorptive compound of the present invention can be obtained. Use of the same substituent for $R_1$ to $R_8$ is preferable since the production process can be simplified.

Examples of the infrared-absorptive compound according to the present invention, represented by Formula (I) or (II) are listed below.

Compounds of from No. (I)-(A)-(1) to No. (II)-(E)-(16) are shown in the following way for simplicity:

For example, when $Y^-$ is $ClO_4^{\ominus}$ or $2Y^-$ is $2Br^{\ominus}$, ions are shown as $ClO_4$ or Br, respectively, a methyl group as $CH_3$, and an ethyl group as $C_2H_5$. For example, a 5-membered ring formed by $R_1$ and $R_2$ is shown as $CH_2CH_2CH_2CH_2$.

| Compound No. |  X | Y | $R_1R_2$ | $R_3R_4$ | $R_5R_6$ | $R_7R_8$ |
|---|---|---|---|---|---|---|
| [I]-(A)-(1) | 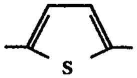 | $ClO_4$ | $CH_2OCH_3$, $CH_2OCH_3$ | $CH_2OCH_3$, $CH_2OCH_3$ | $CH_2OCH_3$, $CH_2OCH_3$ | $CH_2OCH_3$, $CH_2OCH_3$ |
| [I]-(A)-(2) | 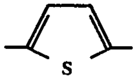 | $BF_4$ | $C_2H_5,C_2H_5$ | $C_2H_5,C_2H_5$ | $C_2H_5,C_2H_5$ | $C_2H_5,C_2H_5$ |
| [I]-(A)-(3) | 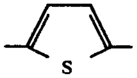 | $SbF_6$ | $C_2H_5,C_2H_5$ | $C_2H_5,C_2H_5$ | $C_2H_5,C_2H_5$ | $C_2H_5,C_2H_5$ |
| [I]-(A)-(4) | 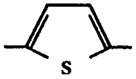 | Br | $CH_2CH(CH_3)C_2H_5,CH_2CH(CH_3)C_2H_5$ | $CH_2CH(CH_3)C_2H_5,CH_2CH(CH_3)C_2H_5$ | $CH_2CH(CH_3)C_2H_5,CH_2CH(CH_3)C_2H_5$ | $CH_2CH(CH_3)C_2H_5,CH_2CH(CH_3)C_2H_5$ |
| [I]-(A)-(5) | 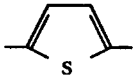 | $ClO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(A)-(6) | 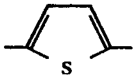 | $SbF_8$ | iso-$C_3H_7$,iso-$C_3H_7$ | iso-$C_3H_7$,iso-$C_3H_7$ | iso-$C_3H_7$,iso-$C_3H_7$ | iso-$C_3H_7$,iso-$C_3H_7$ |
| [I]-(A)-(7) | 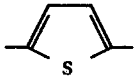 | $CH_3SO_4$ | $C_3H_6OC_3H_7,C_3H_6OC_2H_7$ | $C_3H_6OC_3H_7,C_3H_6OC_2H_7$ | $C_3H_6OC_3H_7,C_3H_6OC_2H_7$ | $C_3H_6OC_3H_7,C_3H_6OC_2H_7$ |
| [I]-(A)-(8) | 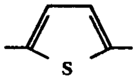 | $ClO_4$ | $CH_2CH{=}CH_2,CH_2CH{=}CH_2$ | $CH_2CH{=}CH_2,CH_2CH{=}CH_2$ | $CH_2CH{=}CH_2,CH_2CH{=}CH_2$ | $CH_2CH{=}CH_2,CH_2CH{=}CH_2$ |
| [I]-(A)-(9) | 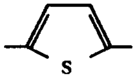 | $A_5F_6$ | $C_3H_4CH{=}CH_2,C_3H_4CH{=}CH_2$ | $C_3H_4CH{=}CH_2,C_3H_4CH{=}CH_2$ | $C_3H_4CH{=}CH_2,C_3H_4CH{=}CH_2$ | $C_3H_4CH{=}CH_2,C_3H_4CH{=}CH_2$ |

-continued

| Compound No. |  X | Y | $R_1R_2$ | $R_3R_4$ | $R_5R_6$ | $R_7R_8$ |
|---|---|---|---|---|---|---|
| [I]-(A)-(10) | 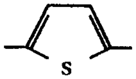 | $ClO_4$ | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [I]-(A)-(11) | 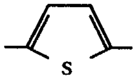 | Cl'' | n-$C_{10}H_{21}$,n-$C_{10}H_{21}$ | n-$C_{10}H_{21}$,n-$C_{10}H_{21}$ | n-$C_{10}H_{21}$,n-$C_{10}H_{21}$ | n-$C_{10}H_{21}$,n-$C_{10}H_{21}$ |
| [I]-(A)-(12) | 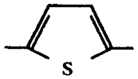 | $ClO_4$ | $C_2H_4CH{=}CH_2$,$C_2H_4CH{=}CH_2$ | $C_2H_4CH{=}CH_2$,$C_2H_4CH{=}CH_2$ | $C_2H_4CH{=}CH_2$,$C_2H_4CH{=}CH_2$ | $C_2H_4CH{=}CH_2$,$C_2H_4CH{=}CH_2$ |
| [I]-(A)-(13) | 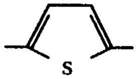 | $ClO_4$ | $C_2H_4OC_2H_5$,$C_2H_4OC_2H_5$ | $C_2H_4OC_2H_5$,$C_2H_4OC_2H_5$ | $C_2H_4OC_2H_5$,$C_2H_4OC_2H_5$ | $C_2H_4OC_2H_5$,$C_2H_4OC_2H_5$ |
| [I]-(A)-(14) | 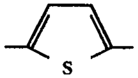 | $SbF_6$ | $C_2H_4OCH_3$,$C_2H_4OCH_3$ | $C_2H_4OCH_3$,$C_2H_4OCH_3$ | $C_2H_4OCH_3$,$C_2H_4OCH_3$ | $C_2H_4OCH_3$,$C_2H_4OCH_3$ |
| [I]-(A)-(15) | 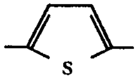 | 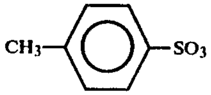 | n-$C_3H_7$,n-$C_3H_7$ | n-$C_4H_9$,n-$C_4H_9$ | n-$C_3H_7$,n-$C_3H_7$ | n-$C_4H_9$,n-$C_4H_9$ |
| [I]-(A)-(16) | 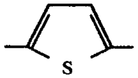 | $SbF_6$ | $CH_2CH_2CH_2CH_2$ | $CH_2CH_2CH_2CH_2$ | $CH_2CH_2CH_2CH_2$ | $CH_2CH_2CH_2CH_2$ |
| [I]-(A)-(17) | 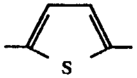 | $ClO_4$ | $CH(CH_3)CH_2CH_2CH_2$ | $CH(CH_3)CH_2CH_2CH_2$ | $CH(CH_3)CH_2CH_2CH_2$ | $CH(CH_3)CH_2CH_2CH_2$ |
| [I]-(A)-(18) | 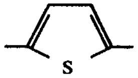 | $ClO_4$ | $CH_2CH_2OCH_2CH_2$ | $CH_2CH_2OCH_2CH_2$ | $CH_2CH_2OCH_2CH_2$ | $CH_2CH_2OCH_2CH_2$ |

-continued

| Compound No. |  X | Y | $R_1R_2$ | $R_3R_4$ | $R_5R_6$ | $R_7R_8$ |
|---|---|---|---|---|---|---|
| [I]-(A)-(19) | 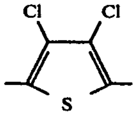 | $NO_3$ | $CH_2CH_2CH_2CH_2CH_2$ | $CH_2CH_2CH_2CH_2CH_2$ | $CH_2CH_2CH_2CH_2CH_2$ | $CH_2CH_2CH_2CH_2CH_2$ |
| [I]-(A)-(20) | 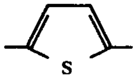 | $SbF_2$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ |
| [I]-(A)-(21) | 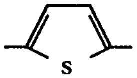 | $ClO_4$ | $n\text{-}C_2H_7,n\text{-}C_3H_7$ | $n\text{-}C_2H_7,n\text{-}C_3H_7$ | $n\text{-}C_4H_{11},n\text{-}C_5H_{11}$ | $n\text{-}C_4H_{11},n\text{-}C_5H_{11}$ |
| [I]-(A)-(22) | 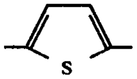 | I | $C_3H_7OH,C_3H_7OH$ | $C_3H_7OH,C_3H_7OH$ | $C_3H_7OH,C_3H_7OH$ | $C_3H_7OH,C_3H_7OH$ |
| [I]-(A)-(23) | 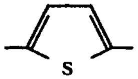 | $ClO_4$ | $C_2H_5,C_3H_7$ | $C_2H_5,C_3H_7$ | $C_2H_5,C_3H_7$ | $C_2H_5,C_3H_7$ |
| [I]-(A)-(24) | 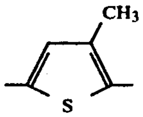 | Br | $CH_2CH(C_2H_5)C_3H_7,CH_2CH(C_2H_5)C_3H_7$ | $n\text{-}C_5H_{11},n\text{-}C_5H_{11}$ | $n\text{-}C_5H_{11},n\text{-}C_5H_{11}$ | $n\text{-}C_5H_{11},n\text{-}C_5H_{11}$ |
| [I]-(A)-(25) | $SbF_6$ | $CH(CH_3)CH_2CH_2CH_2$ | $CH(CH_3)CH_2CH_2CH_2$ | $CH(CH_3)CH_2CH_2CH_2$ | $CH(CH_3)CH_2CH_2CH_2$ | |
| [I]-(A)-(26) | $ClO_4$ | $C_2H_4C{\equiv}CH_1C_2H_4C{\equiv}CH$ | $C_2H_4C{\equiv}CH_1C_2H_4C{\equiv}CH$ | $C_2H_4C{\equiv}CH_1C_2H_4C{\equiv}CH$ | $C_2H_4C{\equiv}CH_1C_2H_4C{\equiv}CH$ | |
| [I]-(A)-(27) | 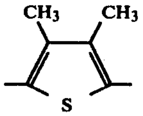 | I | $C_2H_5C{\equiv}CH,C_3H_6C{\equiv}CH$ | $C_2H_5C{\equiv}CH,C_3H_6C{\equiv}CH$ | $C_2H_5C{\equiv}CH,C_3H_6C{\equiv}CH$ | $C_2H_5C{\equiv}CH,C_3H_6C{\equiv}CH$ |

-continued

| Compound No. |  X | Y | $R_1R_2$ | $R_3R_4$ | $R_5R_6$ | $R_7R_8$ |
|---|---|---|---|---|---|---|
| [I]-(A)-(28) | 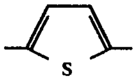 | $SbF_6$ | n-$C_3H_6$,n-$C_2H_7$ | n-$C_3H_6$,n-$C_2H_7$ | n-$C_3H_6$,n-$C_2H_7$ | n-$C_3H_6$,n-$C_2H_7$ |
| [I]-(A)-(29) | 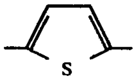 | $ClO_4$ | $C_6H_4Cl$,$C_6H_4Cl$ | $C_6H_4Cl$,$C_6H_4Cl$ | $C_6H_4Cl$,$C_6H_4Cl$ | $C_6H_4Cl$,$C_6H_4Cl$ |
| [I]-(A)-(30) | 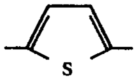 | $AsF_6$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(A)-(31) | 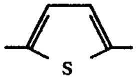 | $ClO_4$ | $CH_3$ $CH_3$<br>\| \|<br>$CHCH_2CH_2CH$ | $CH_3$ $CH_3$<br>\| \|<br>$CHCH_2CH_2CH$ | $CH_3$ $CH_3$<br>\| \|<br>$CHCH_2CH_2CH$ | $CH_3$ $CH_3$<br>\| \|<br>$CHCH_2CH_2CH$ |
| [I]-(A)-(32) | 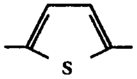 | $BF_4$ | $CH_3$,$CH_3$ | $CH_3$,$CH_3$ | $CH_3$,$CH_3$ | $CH_3$,$CH_3$ |
| [I]-(A)-(33) | 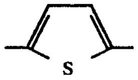 | Br | $C_2H_4Cl$,$C_2H_4Cl$ | $C_2H_4Cl$,$C_2H_4Cl$ | $C_2H_4Cl$,$C_2H_4Cl$ | $C_2H_4Cl$,$C_2H_4Cl$ |
| [I]-(A)-(34) | 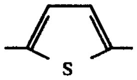 | $ClO_4$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ |
| [I]-(A)-(35) | 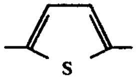 | $SbF_3$ | $C_2H_4OCH_3$,$C_2H_4OCH_3$ | $C_2H_4OCH_3$,$C_2H_4OCH_3$ | $C_2H_6$,$C_2H_6$ | $C_2H_6$,$C_2H_6$ |
| [I]-(B)-(1) | 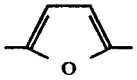 | $AsF_6$ | $CH_3$,$CH_3$ | $CH_3$,$CH_3$ | $CH_3$,$CH_3$ | $CH_3$,$CH_3$ |

-continued

| Compound No. | 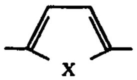 X | Y | $R_1R_2$ | $R_3R_4$ | $R_5R_6$ | $R_7R_8$ |
|---|---|---|---|---|---|---|
| [I]-(B)-(2) | 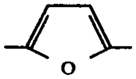 | $ClO_4$ | $C_2H_6,C_2H_6$ | $C_2H_6,C_2H_6$ | $C_2H_6,C_2H_6$ | $C_2H_6,C_2H_6$ |
| [I]-(B)-(3) | 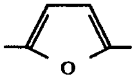 | $SbF_6$ | $CH_2OC_2H_5,CH_2OC_2H_5$ | $CH_2OC_2H_5,CH_2OC_2H_5$ | $CH_2OC_2H_5,CH_2OC_2H_5$ | $CH_2OC_2H_5,CH_2OC_2H_5$ |
| [I]-(B)-(4) | 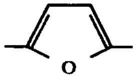 | Br | $CH_3$ $CH_3$<br>$CH_2CHC_2H_5,CH_2CHC_2H_5$ | $CH_3$ $CH_3$<br>$CH_2CHC_2H_5,CH_2CHC_2H_5$ | $CH_3,CH_3$ | $CH_3,CH_3$ |
| [I]-(B)-(5) | 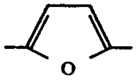 | $ClO_4$ | $n-C_2H_7,n-C_3H_7$ | $n-C_2H_7,n-C_3H_7$ | $n-C_2H_7,n-C_3H_7$ | $n-C_2H_7,n-C_3H_7$ |
| [I]-(B)-(6) | 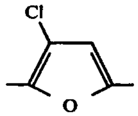 | $SbF_6$ | $iso-C_2H_7,iso-C_2H_7$ | $iso-C_2H_7,iso-C_2H_7$ | $iso-C_2H_7,iso-C_2H_7$ | $iso-C_2H_7,iso-C_2H_7$ |
| [I]-(B)-(7) | 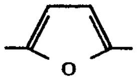 | I | $n-C_4H_9,n-C_4H_9$ | $n-C_4H_9,n-C_4H_9$ | $n-C_4H_9,n-C_4H_9$ | $n-C_4H_9,n-C_4H_9$ |
| [I]-(B)-(8) | 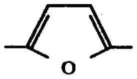 | $SbF_6$ | $CH_2CH{=}CH_2,CH_2CH{=}CH_2$ | $CH_2CH{=}CH_2,CH_2CH{=}CH_2$ | $CH_2CH{=}CH_2,CH_2CH{=}CH_2$ | $CH_2CH{=}CH_2,CH_2CH{=}CH_2$ |
| [I]-(B)-(9) | 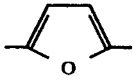 | $ClO_4$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ |
| [I]-(B)-(10) | 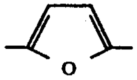 | $ClO_4$ | $n-C_5H_{11},n-C_5H_{11}$ | $n-C_5H_{11},n-C_5H_{11}$ | $n-C_5H_{11},n-C_5H_{11}$ | $n-C_5H_{11},n-C_5H_{11}$ |

-continued

| Compound No. |  | Y | $R_1R_2$ | $R_3R_4$ | $R_5R_6$ | $R_7R_8$ |
|---|---|---|---|---|---|---|
| [I]-(B)-(11) | 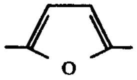 | 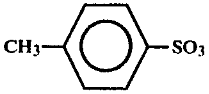 | n-$C_{12}H_{26}$,n-$C_{12}H_{26}$ | n-$C_{12}H_{26}$,n-$C_{12}H_{26}$ | n-$C_{12}H_{26}$,n-$C_{12}H_{26}$ | n-$C_{12}H_{26}$,n-$C_{12}H_{26}$ |
| [I]-(B)-(12) | 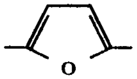 | $ClO_4$ | $C_2H_4CH{=}CH_2$,$C_2H_4CH{=}CH_2$ | $C_2H_4CH{=}CH_2$,$C_2H_4CH{=}CH_2$ | $C_2H_4CH{=}CH_2$,$C_2H_4CH{=}CH_2$ | $C_2H_4CH{=}CH_2$,$C_2H_4CH{=}CH_2$ |
| [I]-(B)-(13) | 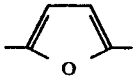 | $BF_4$ | $CH_2OCH_3$,$CH_2OCH_3$ | $CH_2OCH_3$,$CH_2OCH_3$ | $CH_2OCH_3$,$CH_2OCH_3$ | $CH_2OCH_3$,$CH_2OCH_3$ |
| [I]-(B)-(14) | 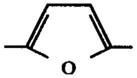 | $SbF_6$ | $C_2H_4OCH_3$,$C_2H_4OCH_3$ | $C_2H_4OCH_3$,$C_2H_4OCH_3$ | $C_2H_4OCH_3$,$C_2H_4OCH_3$ | $C_2H_4OCH_3$,$C_2H_4OCH_3$ |
| [I]-(B)-(15) | 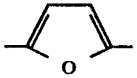 | $C_2H_5SO_4$ | $C_2H_4OC_4H_9$,$C_2H_4OC_4H_9$ | n-$C_3H_7$,n-$C_3H_7$ | $C_2H_4OC_4H_9$,$C_2H_4OC_4H_9$ | n-$C_3H_7$,n-$C_3H_7$ |
| [I]-(B)-(16) | 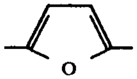 | $SbF_6$ | $CH_2CH_2CH_2CH_2$ | $CH_2CH_2CH_2CH_2$ | $CH_2CH_2CH_2CH_2$ | $CH_2CH_2CH_2CH_2$ |
| [I]-(B)-(17) | 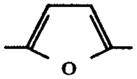 | $ClO_4$ | $CH(CH_3)CH_2CH_2CH(CH_3)$ | $CH(CH_3)CH_2CH_2CH(CH_3)$ | $CH(CH_3)CH_2CH_2CH(CH_3)$ | $CH(CH_3)CH_2CH_2CH(CH_3)$ |
| [I]-(B)-(18) | 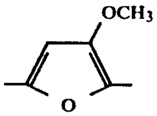 | $ClO_4$ | $CH_2CH_2OCH_2CH_2$ | $CH_2CH_2OCH_2CH_2$ | $CH_2CH_2OCH_2CH_2$ | $CH_2CH_2OCH_2CH_2$ |
| [I]-(B)-(19) | 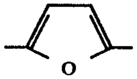 | $NO_3$ | $CH_2CH_2CH_2CH_2CH_2$ | $CH_2CH_2CH_2CH_2CH_2$ | $CH_2CH_2CH_2CH_2CH_2$ | $CH_2CH_2CH_2CH_2CH_2$ |

-continued

| Compound No. |  X | Y | $R_1R_2$ | $R_3R_4$ | $R_5R_6$ | $R_7R_8$ |
|---|---|---|---|---|---|---|
| [I]-(B)-(20) | 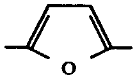 | $SbF_6$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ |
| [I]-(B)-(21) | 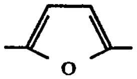 | $ClO_4$ | $C_2H_5C(CH_3){=}CH_2,C_2H_5C(CH_3){=}CH_2$ | $C_2H_5C(CH_3){=}CH_2,C_2H_5C(CH_3){=}CH_2$ | $n\text{-}C_4H_9,n\text{-}C_4H_9$ | $n\text{-}C_4H_9,n\text{-}C_4H_9$ |
| [I]-(B)-(22) | 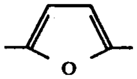 | $BF_4$ | $C_2H_4OH,C_2H_4OH$ | $C_2H_4OH,C_2H_4OH$ | $C_2H_4OH,C_2H_4OH$ | $C_2H_4OH,C_2H_4OH$ |
| [I]-(B)-(23) | 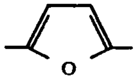 | $ClO_4$ | $C_4H_9,C_3H_7$ | $C_4H_9,C_3H_7$ | $C_4H_9,C_3H_7$ | $C_4H_9,C_3H_7$ |
| [I]-(B)-(24) | 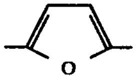 | Br | $CH_2CH(C_2H_5)C_3H_7,CH_2CH(C_2H_5)C_3H_7$ | $n\text{-}C_5H_{11},n\text{-}C_4H_{11}$ | $n\text{-}C_5H_{11},n\text{-}C_4H_{11}$ | $n\text{-}C_5H_{11},n\text{-}C_4H_{11}$ |
| [I]-(B)-(25) | 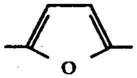 | $SbF_4$ | $CH(CH_3)CH_2CH_2CH_2$ | $CH(CH_3)CH_2CH_2CH_2$ | $CH(CH_3)CH_2CH_2CH_2$ | $CH(CH_3)CH_2CH_2CH_2$ |
| [I]-(B)-(26) | 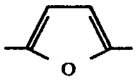 | $ClO_4$ | $CH_2C\equiv CH,CH_2C\equiv CH$ | $CH_2C\equiv CH,CH_2C\equiv CH$ | $CH_2C\equiv CH,CH_2C\equiv CH$ | $CH_2C\equiv CH,CH_2C\equiv CH$ |
| [I]-(B)-(27) | 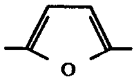 | I | $C_3H_6C\equiv CH,C_3H_6C\equiv CH$ | $C_3H_6C\equiv CH,C_3H_6C\equiv CH$ | $C_3H_6C\equiv CH_3\ H_6C\equiv CH$ | $C_3H_6C\equiv CH,C_3H_6C\equiv CH$ |
| [I]-(B)-(28) | 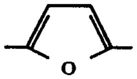 | $SbF_4$ | $n\text{-}C_3H_7,n\text{-}C_3H_7$ | $n\text{-}C_3H_7,n\text{-}C_3H_7$ | $n\text{-}C_3H_7,n\text{-}C_3H_7$ | $n\text{-}C_3H_7,n\text{-}C_3H_7$ |

-continued

| Compound No. |  | Y | $R_1R_2$ | $R_3R_4$ | $R_5R_6$ | $R_7R_8$ |
|---|---|---|---|---|---|---|
| [I]-(B)-(29) | 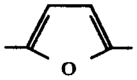 | $ClO_4$ | $C_6H_4CH_3,C_6H_4CH_3$ | $C_6H_4CH_3,C_6H_4CH_3$ | $C_6H_4CH_3,C_6H_4CH_3$ | $C_6H_4CH_3,C_6H_4CH_3$ |
| [I]-(B)-(30) | 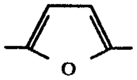 | $AsF_6$ | $C_2H_5,C_2H_5$ | $C_2H_5,C_2H_5$ | $C_2H_5,C_2H_5$ | $C_2H_5,C_2H_5$ |
| [I]-(C)-(1) | 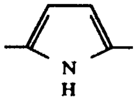 | $ClO_4$ | $CH{=}C(CH_3)CH_2C(CH_2)_2CH_2$ | $CH{=}C(CH_3)CH_2C(CH_2)_2CH_2$ | $CH{=}C(CH_3)CH_2C(CH_2)_2CH_2$ | $CH{=}C(CH_3)CH_2C(CH_2)_2CH_2$ |
| [I]-(C)-(2) | 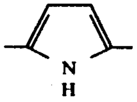 | $ClO_4$ | n-$C_3H_7$,n-$C_4H_7$ | n-$C_3H_7$,n-$C_4H_7$ | n-$C_5H_{11}$,n-$C_5H_{11}$ | n-$C_5H_{11}$,n-$C_5H_{11}$ |
| [I]-(C)-(3) | 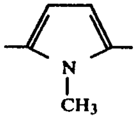 | I | $C_3H_7OH,C_3H_7OH$ | $C_3H_7OH,C_3H_7OH$ | $C_3H_7OH,C_3H_7OH$ | $C_3H_7OH,C_3H_7OH$ |
| [I]-(C)-(4) | 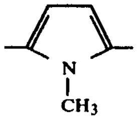 | $ClO_4$ | $C_2H_5,C_2H_5$ | $C_2H_5,C_2H_5$ | $C_2H_5,C_2H_5$ | $C_2H_5,C_2H_5$ |
| [I]-(C)-(5) | 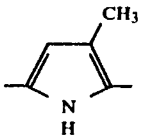 | Br | n-$C_5H_{11}$,n-$C_5H_{11}$ | n-$C_5H_{11}$,n-$C_5H_{11}$ | n-$C_5H_{11}$,n-$C_5H_{11}$ | n-$C_5H_{11}$,n-$C_5H_{11}$ |

-continued

| Compound No. |  X | Y | $R_1R_2$ | $R_3R_4$ | $R_5R_6$ | $R_7R_8$ |
|---|---|---|---|---|---|---|
| [I]-(C)-(6) | 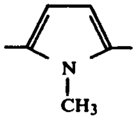 | $SbF_6$ | $CH_3$<br>\|<br>$CHCH_2CH_2CH_2$ | $CH_3$<br>\|<br>$CHCH_2CH_2CH_2$ | $CH_3$<br>\|<br>$CHCH_2CH_2CH_2$ | $CH_3$<br>\|<br>$CHCH_2CH_2CH_2$ |
| [I]-(C)-(7) | 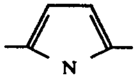 | $ClO_4$ | $C_2H_4C{\equiv}CH,C_2H_4C{\equiv}CH$ | $C_2H_4C{\equiv}CH,C_2H_4C{\equiv}CH$ | $C_2H_4C{\equiv}C\ H,C_2H_4C\ {\equiv}CH$ | $C_2H_4C{\equiv}CH,C_2H_4C{\equiv}CH$ |
| [I]-(C)-(8) | 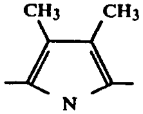 | I | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [I]-(C)-(9) | 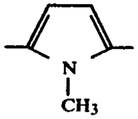 | $SbF_6$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(C)-(10) | 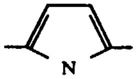 | $ClO_4$ | n-$C_7H_{15}$,n-$C_7H_{15}$ | n-$C_7H_{15}$,n-$C_7H_{15}$ | n-$C_7H_{15}$,n-$C_7H_{15}$ | n-$C_7H_{15}$,n-$C_7H_{15}$ |
| [I]-(C)-(11) | 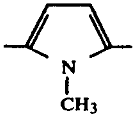 | $BF_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(C)-(12) | 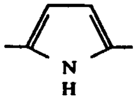 | $SbF_6$ | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [I]-(C)-(13) | 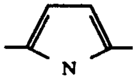 | Br | $CH_3$ $CH_3$<br>\| \|<br>$CH_2CHC_2H_5,CH_2CHC_2H_5$ | $CH_3$ $CH_3$<br>\| \|<br>$CH_2CHC_2H_5,CH_2CHC_2H_5$ | $CH_3$ $CH_3$<br>\| \|<br>$CH_2CHC_2H_5,CH_2CHC_2H_5$ | $CH_3$ $CH_3$<br>\| \|<br>$CH_2CHC_2H_5,CH_2CHC_2H_5$ |

-continued

| Compound No. |  X | Y | $R_1R_2$ | $R_3R_4$ | $R_5R_6$ | $R_7R_8$ |
|---|---|---|---|---|---|---|
| [I]-(C)-(14) | 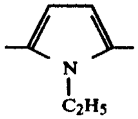 | $ClO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(C)-(15) | 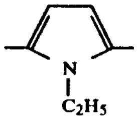 | $SbF_6$ | iso-$C_3H_7$,iso-$C_3H_7$ | iso-$C_3H_7$,iso-$C_3H_7$ | iso-$C_3H_7$,iso-$C_3H_7$ | iso-$C_3H_7$,iso-$C_3H_7$ |
| [I]-(C)-(16) | 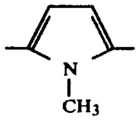 | $CH_2SO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(C)-(17) | 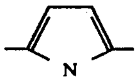 | $ClO_4$ | $CH_2CH{=}CH_2$,$CH_2CH{=}CH_2$ | $CH_2CH{=}CH_2$,$CH_2CH{=}CH_2$ | $CH_2CH{=}CH_2$,$CH_2CH{=}CH_2$ | $CH_2CH{=}CH_2$,$CH_2CH{=}CH_2$ |
| [I]-(C)-(18) | 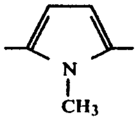 | $A_5F_6$ | $C_2H_4CH{=}CH_2$,$C_2H_4CH{=}CH_2$ | $C_2H_4CH{=}CH_2$,$C_2H_4CH{=}CH_2$ | $C_2H_4CH{=}CH_2$,$C_2H_4CH{=}CH_2$ | $C_2H_4CH{=}CH_2$,$C_2H_4CH{=}CH_2$ |
| [I]-(C)-(19) | 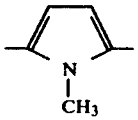 | $ClO_4$ | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [I]-(C)-(20) | 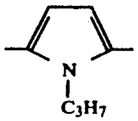 | Cl'' | n-$C_{11}H_{23}$,n-$C_{11}H_{23}$ | n-$C_{11}H_{23}$,n-$C_{11}H_{23}$ | n-$C_{11}H_{23}$,n-$C_{11}H_{23}$ | n-$C_{11}H_{23}$,n-$C_{11}H_{23}$ |

-continued

| Compound No. |  X | Y | $R_1R_2$ | $R_3R_4$ | $R_5R_6$ | $R_7R_8$ |
|---|---|---|---|---|---|---|
| [I]-(C)-(21) | 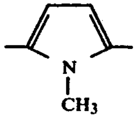 | $ClO_4$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ |
| [I]-(C)-(22) | 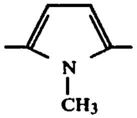 | $ClO_4$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ |
| [I]-(C)-(23) | 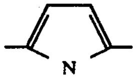 | $SbF_5$ | $C_2H_4OCH_3,C_2H_4OCH_3$ | $C_2H_4OCH_3,C_2H_4OCH_3$ | $C_2H_4OCH_3,C_2H_4OCH_3$ | $C_2H_4OCH_3,C_2H_4OCH_3$ |
| [I]-(C)-(24) | 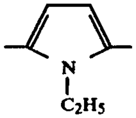 | 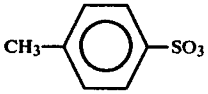 | $C_2H_4OC_2H_5,C_2H_4OC_2H_5$ | n-$C_4H_9$,n-$C_4H_9$ | $C_2H_4OC_2H_5,C_2H_4OC_2H_5$ | n-$C_4H_9$,n-$C_4H_9$ |
| [I]-(C)-(25) | 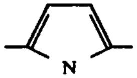 | $SbF_6$ | $CH_3$<br>\|<br>$CHCH_2CH_2CH_2$ | $CH_3$<br>\|<br>$CHCH_2CH_2CH_2$ | $CH_3$<br>\|<br>$CHCH_2CH_2CH_2$ | $CH_3$<br>\|<br>$CHCH_2CH_2CH_2$ |
| [I]-(C)-(26) | 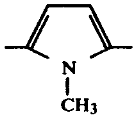 | $ClO_4$ | Cl Cl<br>\| \|<br>$CHCH_2CH_2CH$ | Cl Cl<br>\| \|<br>$CHCH_2CH_2CH$ | Cl Cl<br>\| \|<br>$CHCH_2CH_2CH$ | Cl Cl<br>\| \|<br>$CHCH_2CH_2CH$ |
| [I]-(C)-(27) | 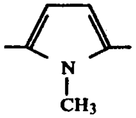 | $ClO_4$ | $CH_2CH_2OCH_2CH_2$ | $CH_2CH_2OCH_2CH_2$ | $CH_2CH_2OCH_2CH_2$ | $CH_2CH_2OCH_2CH_2$ |

-continued

| Compound No. |  X | Y | $R_1R_2$ | $R_3R_4$ | $R_5R_6$ | $R_7R_8$ |
|---|---|---|---|---|---|---|
| [I]-(C)-(28) | 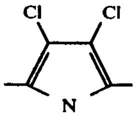 | $NO_3$ | $CH_2CH_2CH_2CH_2CH_2$ | $CH_2CH_2CH_2CH_2CH_2$ | $CH_2CH_2CH_2CH_2CH_2$ | $CH_2CH_2CH_2CH_2CH_2$ |
| [I]-(C)-(29) | 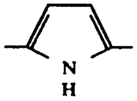 | $ClO_4$ | $C_6H_4Br,C_6H_4Br$ | $C_6H_4Br,C_6H_4Br$ | $C_6H_4Br,C_6H_4Br$ | $C_6H_4Br,C_6H_4Br$ |
| [I]-(C)-(30) | 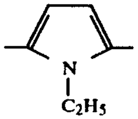 | $AsF_6$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(C)-(31) | 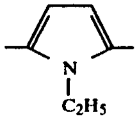 | $ClO_4$ | $CH_3$ $CH_3$<br>$CHCH_2CH_2CH$ | $CH_3$ $CH_3$<br>$CHCH_2CH_2CH$ | $CH_3$ $CH_3$<br>$CHCH_2CH_2CH$ | $CH_3$ $CH_3$<br>$CHCH_2CH_2CH$ |
| [I]-(C)-(32) | 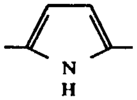 | $BF_4$ | $CH_3,CH_3$ | $CH_3,CH_3$ | $CH_3,CH_3$ | $CH_3,CH_3$ |
| [I]-(C)-(33) | 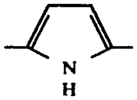 | Br | $C_2H_4Cl,C_2H_4Cl$ | $C_2H_4Cl,C_2H_4Cl$ | $C_2H_4Cl,C_2H_4Cl$ | $C_2H_4Cl,C_2H_4Cl$ |
| [I]-(C)-(34) | 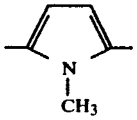 | $ClO_4$ | $CH{=}C(CH_3)CH_2C(CH_2)_2CH_2$ | $CH{=}C(CH_3)CH_2C(CH_2)_2CH_2$ | $CH{=}C(CH_3)CH_2C(CH_2)_2CH_2$ | $CH{=}C(CH_3)CH_2C(CH_2)_2CH_2$ |

-continued

| Compound No. |  X | Y | $R_1R_2$ | $R_3R_4$ | $R_5R_6$ | $R_7R_8$ |
|---|---|---|---|---|---|---|
| [I]-(C)-(35) | 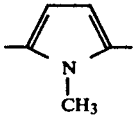 | $SbF_4$ | n-$C_4H_9$,n-$C_4H_9$ | n-$C_4H_9$,n-$C_4H_9$ | $C_2H_5$,$C_2H_5$ | $C_2H_5$,$C_2H_5$ |
| [I]-(D)-(1) | 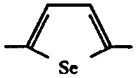 | $SbF_6$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(D)-(2) | 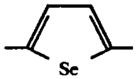 | $BF_4$ | $C_3H_4OCH_3$,$C_3H_4OCH_3$ | $C_3H_4OCH_3$,$C_3H_4OCH_3$ | $C_3H_4OCH_3$,$C_3H_4OCH_3$ | $C_3H_4OCH_3$,$C_3H_4OCH_3$ |
| [I]-(D)-(3) | 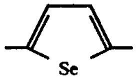 | $SbF_6$ | $C_3H_6OC_3H_5$,$C_3H_6OC_3H_5$ | $C_3H_6OC_3H_5$,$C_3H_6OC_3H_5$ | $C_3H_6OC_3H_5$,$C_3H_6OC_3H_5$ | $C_3H_6OC_3H_5$,$C_3H_6OC_3H_5$ |
| [I]-(D)-(4) | 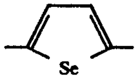 | Br | $C_2H_4CH(CH_3)CH_3$,$C_2H_4CH(CH_3)CH_3$ | $C_2H_4CH(CH_3)CH_3$,$C_2H_4CH(CH_3)CH_3$ | $C_2H_4CH(CH_3)CH_3$,$C_2H_4CH(CH_3)CH_3$ | $C_2H_4CH(CH_3)CH_3$,$C_2H_4CH(CH_3)CH_3$ |
| [I]-(D)-(5) | 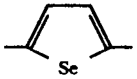 | $ClO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(D)-(6) | 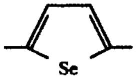 | $SbF_6$ | iso-$C_3H_7$,iso-$C_3H_7$ | iso-$C_3H_7$,iso-$C_3H_7$ | iso-$C_3H_7$,iso-$C_3H_7$ | iso-$C_3H_7$,iso-$C_3H_7$ |
| [I]-(D)-(7) | 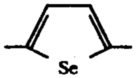 | $CH_3SO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(D)-(8) | 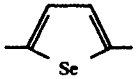 | $ClO_4$ | $CH_2CH=CH_2$,$CH_2CH=CH_2$ | $CH_2CH=CH_2$,$CH_2CH=CH_2$ | $CH_2CH=CH_2$,$CH_2CH=CH_2$ | $CH_2CH=CH_2$,$CH_2CH=CH_2$ |

-continued

| Compound No. | 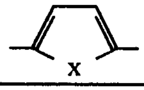 | Y | $R_1R_2$ | $R_3R_4$ | $R_5R_6$ | $R_7R_8$ |
|---|---|---|---|---|---|---|
| [I]-(D)-(9) | 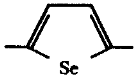 | $AsF_6$ | $C_2H_4{=}CH_2,C_2H_4CH{=}CH_2$ | $C_2H_4{=}CH_2,C_2H_4CH{=}CH_2$ | $C_2H_4{=}CH_2,C_2H_4CH{=}CH_2$ | $C_2H_4{=}CH_2,C_2H_4CH{=}CH_2$ |
| [I]-(D)-(10) | 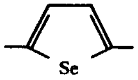 | $ClO_4$ | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [I]-(D)-(11) | 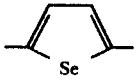 | $SbF_6$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ |
| [I]-(D)-(12) | 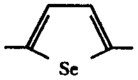 | $ClO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(D)-(13) | 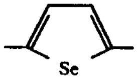 | I | $C_3H_7OH,C_3H_7OH$ | $C_3H_7OH,C_3H_7OH$ | $C_3H_7OH,C_3H_7OH$ | $C_3H_7OH,C_3H_7OH$ |
| [I]-(D)-(14) | 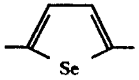 | $ClO_4$ | $C_3H_5,C_3H_7$ | $C_3H_5,C_3H_7$ | $C_3H_5,C_3H_7$ | $C_3H_5,C_3H_7$ |
| [I]-(D)-(15) | 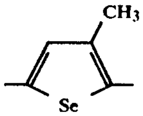 | Br | $CH_2CH(C_2H_5)C_3H_7,CH_2CH(C_2H_5)C_3H_7$ | n-$C_4H_{11}$,n-$C_5H_{11}$ | n-$C_4H_{11}$,n-$C_5H_{11}$ | n-$C_4H_{11}$,n-$C_5H_{11}$ |
| [I]-(D)-(16) | 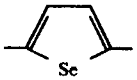 | $SbF_6$ | $CH(CH_3)CH_2CH_2CH_2$ | $CH(CH_3)CH_2CH_2CH_2$ | $CH(CH_3)CH_2CH_2CH_2$ | $CH(CH_3)CH_2CH_2CH_2$ |
| [I]-(D)-(17) | 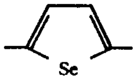 | $ClO_4$ | $C_3H_4C{\equiv}CH,C_2H_4C{\equiv}CH$ | $C_3H_4C{\equiv}CH,C_2H_4C{\equiv}CH$ | $C_3H_4C{\equiv}CH,C_2H_4C{\equiv}CH$ | $C_3H_4C{\equiv}CH,C_2H_4C{\equiv}CH$ |

-continued

| Compound No. |  X | Y | $R_1R_2$ | $R_3R_4$ | $R_5R_6$ | $R_7R_8$ |
|---|---|---|---|---|---|---|
| [I]-(D)-(18) | 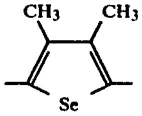 | I | $C_3H_5C{\equiv}CH,C_3H_5C{\equiv}CH$ | $C_3H_5C{\equiv}CH,C_3H_5C{\equiv}CH$ | $C_3H_5C{\equiv}CH,C_3H_5C{\equiv}CH$ | $C_3H_5C{\equiv}CH,C_3H_5C{\equiv}CH$ |
| [I]-(E)-(1) | 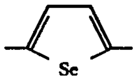 | $SbF_6$ | $CH_2CH_2OCH_2CH_2$ | $CH_2CH_2OCH_2CH_2$ | $CH_2CH_2OCH_2CH_2$ | $CH_2CH_2OCH_2CH_2$ |
| [I]-(E)-(2) | 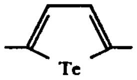 | $ClO_4$ | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [I]-(E)-(3) | 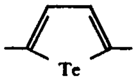 | $ClO_4$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ |
| [I]-(E)-(4) | 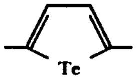 | $SbF_6$ | $C_2H_4OCH_3,C_2H_4OCH_3$ | $C_2H_4OCH_3,C_2H_4OCH_3$ | $C_2H_4OCH_3,C_2H_4OCH_3$ | $C_2H_4OCH_3,C_2H_4OCH_3$ |
| [I]-(E)-(5) | 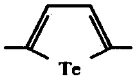 | 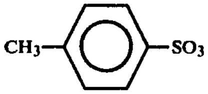 | $C_2H_4OC_2H_5,C_2H_4OC_2H_5$ | n-$C_4H_9$,n-$C_4H_9$ | $C_2H_4OC_2H_5,C_2H_4OC_2H_5$ | n-$C_4H_9$,n-$C_4H_9$ |
| [I]-(E)-(6) | 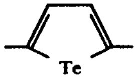 | $SbF_6$ | $\overset{CH_3}{\overset{\mid}{C}H}CH_2CH_2\overset{CH_3}{\overset{\mid}{C}H}$ | $CH_2CH_2CH_2CH$ | $\overset{CH_3}{\overset{\mid}{C}H}CH_2CH_2\overset{CH_3}{\overset{\mid}{C}H}$ | $CH_2CH_2CH_2CH_2$ |
| [I]-(E)-(7) | 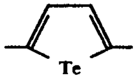 | $ClO_4$ | $\overset{CH_3}{\overset{\mid}{C}H}CH_2CH_2CH_2$ | $\overset{CH_3}{\overset{\mid}{C}H}CH_2CH_2CH_2$ | $\overset{CH_3}{\overset{\mid}{C}H}CH_2CH_2CH_2$ | $\overset{CH_3}{\overset{\mid}{C}H}CH_2CH_2CH_2$ |
| [I]-(E)-(8) | 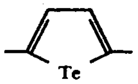 | $ClO_4$ | $CH_2CH_2OCH_2CH_2$ | $CH_2CH_2OCH_2CH_2$ | $CH_2CH_2OCH_2CH_2$ | $CH_2CH_2OCH_2CH_2$ |

-continued

| Compound No. | 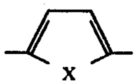 X | Y | $R_1R_2$ | $R_3R_4$ | $R_5R_6$ | $R_7R_8$ |
|---|---|---|---|---|---|---|
| [I]-(E)-(9) | 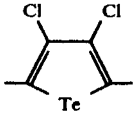 | $NO_3$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(E)-(10) | 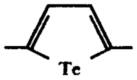 | $ClO_4$ | $C_6H_4Cl$,$C_6H_4Cl$ | $C_6H_4Cl$,$C_6H_4Cl$ | $C_6H_4Cl$,$C_6H_4Cl$ | $C_6H_4Cl$,$C_6H_4Cl$ |
| [I]-(E)-(11) | 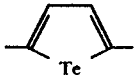 | $AsF_5$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [I]-(E)-(12) | 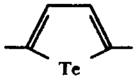 | $ClO_4$ | $CH_3$ $CH_3$<br>$CHCH_2CH_2CH$ | $CH_3$ $CH_3$<br>$CHCH_2CH_2CH$ | $CH_3$ $CH_3$<br>$CHCH_2CH_2CH$ | $CH_3$ $CH_3$<br>$CHCH_2CH_2CH$ |
| [I]-(E)-(13) | 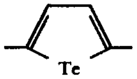 | $BF_4$ | $CH_3$,$C_3H_7$ | $CH_3$,$C_3H_7$ | $CH_3$,$C_3H_7$ | $CH_3$,$C_3H_7$ |
| [I]-(E)-(14) | 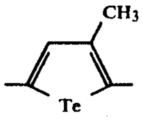 | Br | $C_2H_4OC_2H_5$,$C_2H_4OC_2H_5$ | $C_2H_4OC_2H_5$,$C_2H_4OC_2H_5$ | $C_2H_4OC_2H_5$,$C_2H_4OC_2H_5$ | $C_2H_4OC_2H_5$,$C_2H_4OC_2H_5$ |
| [I]-(E)-(15) | 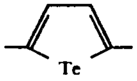 | $ClO_4$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ |
| [I]-(E)-(16) | 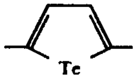 | $SbF_6$ | $CH_2CH{=}CH_2$,$CH_2CH{=}CH_2$ | $CH_2CH{=}CH_2$,$CH_2CH{=}CH_2$ | $CH_2CH{=}CH_2$,$CH_2CH{=}CH_2$ | $CH_2CH{=}CH_2$,$CH_2CH{=}CH_2$ |

| Compound No. | X | Y | $R_1R_2$ | $R_3R_4$ | $R_5R_6$ | $R_7R_8$ |
|---|---|---|---|---|---|---|
| |  | | | | | |
| [II]-(A)-(1) |  | $SbF_6$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [II]-(A)-(2) |  | $BF_4$ | $C_2H_5$,$C_2H_5$ | $C_2H_5$,$C_2H_5$ | $C_2H_5$,$C_2H_5$ | $C_2H_5$,$C_2H_5$ |
| [II]-(A)-(3) |  | $SbF_6$ | $C_{12}H_{25}$,$C_{12}H_{25}$ | $C_{12}H_{25}$,$C_{12}H_{25}$ | $C_{12}H_{25}$,$C_{12}H_{25}$ | $C_{12}H_{25}$,$C_{12}H_{25}$ |
| [II]-(A)-(4) | 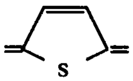 | Br | $CH_3$ $CH_3$<br>$CH_2CHC_2H_5$,$CH_2CHC_2H_5$ | $CH_3$ $CH_3$<br>$CH_2CHC_2H_5$,$CH_2CHC_2H_5$ | $CH_3$ $CH_3$<br>$CH_2CHC_2H_5$,$CH_2CHC_2H_5$ | $CH_3$ $CH_3$<br>$CH_2CHC_2H_5$,$CH_2CHC_2H_5$ |
| [II]-(A)-(5) | 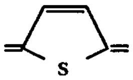 | $ClO_4$ | n-$C_3H_7$,$C_3H_7$ | n-$C_3H_7$,$C_3H_7$ | n-$C_3H_7$,$C_3H_7$ | n-$C_3H_7$,$C_3H_7$ |
| [II]-(A)-(6) |  | $SbF_6$ | iso-$C_3H_7$,iso-$C_3H_7$ | iso-$C_3H_7$,iso-$C_3H_7$ | iso-$C_3H_7$,iso-$C_3H_7$ | iso-$C_3H_7$,iso-$C_3H_7$ |
| [II]-(A)-(7) | 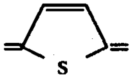 | $CH_2SO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [II]-(A)-(8) |  | $ClO_4$ | $CH_2CH{=}CH_2$,$CH_2CH{=}CH_2$ | $CH_2CH{=}CH_2$,$CH_2CH{=}CH_2$ | $CH_2CH{=}CH_2$,$CH_2CH{=}CH_2$ | $CH_2CH{=}CH_2$,$CH_2CH{=}CH_2$ |
| [II]-(A)-(9) | 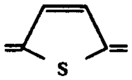 | $AsF_5$ | $C_2H_4CH{=}CH_2$,$C_2H_4CH{=}CH_2$ | $C_2H_4CH{=}CH_2$,$C_2H_4CH{=}CH_2$ | $C_2H_4CH{=}CH_2$,$C_2H_4CH{=}CH_2$ | $C_2H_4CH{=}CH_2$,$C_2H_4CH{=}CH_2$ |

-continued

| Compound No. |  X | Y | $R_1R_2$ | $R_3R_4$ | $R_5R_6$ | $R_7R_8$ |
|---|---|---|---|---|---|---|
| [II]-(A)-(10) | 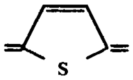 | $ClO_4$ | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [II]-(A)-(11) |  | $Cl^-$ | n-$C_{10}H_{21}$,n-$C_{10}H_{21}$ | n-$C_{10}H_{21}$,n-$C_{10}H_{21}$ | n-$C_{10}H_{21}$,n-$C_{10}H_{21}$ | n-$C_{10}H_{21}$,n-$C_{10}H_{21}$ |
| [II]-(A)-(12) | 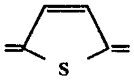 | $ClO_4$ | $C_2H_4CH{=}CH_2$,$C_2H_4CH{=}CH_2$ | $C_2H_4CH{=}CH_2$,$C_2H_4CH{=}CH_2$ | $C_2H_4CH{=}CH_2$,$C_2H_4CH{=}CH_2$ | $C_2H_4CH{=}CH_2$,$C_2H_4CH{=}CH_2$ |
| [II]-(A)-(13) |  | $ClO_4$ | $C_2H_4OC_2H_5$,$C_2H_4OC_2H_5$ | $C_2H_4OC_2H_5$,$C_2H_4OC_2H_5$ | $C_2H_4OC_2H_5$,$C_2H_4OC_2H_5$ | $C_2H_4OC_2H_5$,$C_2H_4OC_2H_5$ |
| [II]-(A)-(14) |  | $SbF_6$ | $C_2H_4OCH_3$,$C_2H_4OCH_3$ | $C_2H_4OCH_3$,$C_2H_4OCH_3$ | $C_2H_4OCH_3$,$C_2H_4OCH_3$ | $C_2H_4OCH_3$,$C_2H_4OCH_3$ |
| [II]-(A)-(15) |  | 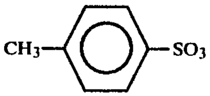 | $C_2H_4OC_3H_7$,$C_2H_4OC_3H_7$ | n-$C_4H_9$,n-$C_4H_9$ | $C_2H_4OC_3H_7$,$C_2H_4OC_3H_7$ | n-$C_4H_9$,n-$C_4H_9$ |
| [II]-(A)-(16) |  | $SbF_6$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ |
| [II]-(A)-(17) | 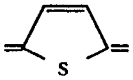 | $ClO_4$ | $CH_3$ \| $CHCH_2CH_2CH_2$ | $CH_3$ \| $CHCH_2CH_2CH_2$ | $CH_3$ \| $CHCH_2CH_2CH_2$ | $CH_3$ \| $CHCH_2CH_2CH_2$ |
| [II]-(A)-(18) | 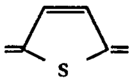 | I | $CH_2CH_2OCH_2CH_2$ | $CH_2CH_2OCH_2CH_2$ | $CH_2CH_2OCH_2CH_2$ | $CH_2CH_2OCH_2CH_2$ |

-continued

| Compound No. |  X | Y | $R_1R_2$ | $R_3R_4$ | $R_5R_6$ | $R_7R_8$ |
|---|---|---|---|---|---|---|
| [II]-(A)-(19) | 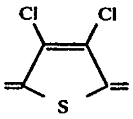 | $NO_3$ | $CH_2CH_2CH_2CH_2CH_2$ | $CH_2CH_2CH_2CH_2CH_2$ | $CH_2CH_2CH_2CH_2CH_2$ | $CH_2CH_2CH_2CH_2CH_2$ |
| [II]-(B)-(1) | 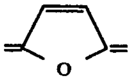 | 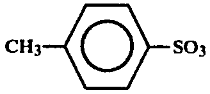 | n-$C_{12}H_{25}$,n-$C_{12}H_{25}$ | n-$C_{12}H_{25}$,n-$C_{12}H_{25}$ | n-$C_{12}H_{25}$,n-$C_{12}H_{25}$ | n-$C_{12}H_{25}$,n-$C_{12}H_{25}$ |
| [II]-(B)-(2) |  | $ClO_4$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ |
| [II]-(B)-(3) | 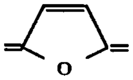 | $BF_4$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ |
| [II]-(B)-(4) |  | $SbF_6$ | $C_2H_4OCH_3,C_2H_4OCH_3$ | $C_2H_4OCH_3,C_2H_4OCH_3$ | $C_2H_4OCH_3,C_2H_4OCH_3$ | $C_2H_4OCH_3,C_2H_4OCH_3$ |
| [II]-(B)-(5) | 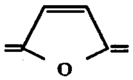 | $C_2H_5SO_4$ | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [II]-(B)-(6) |  | $SbF_6$ | $CH(CH_3)CH_2CH_2CH_2$ | $CH(CH_3)CH_2CH_2CH_2$ | $CH(CH_3)CH_2CH_2CH_2$ | $CH(CH_3)CH_2CH_2CH_2$ |
| [II]-(B)-(7) |  | $ClO_4$ | $CH(CH_3)CH_2CH_2CH(CH_3)$ | $CH(CH_3)CH_2CH_2CH(CH_3)$ | $CH(CH_3)CH_2CH_2CH(CH_3)$ | $CH(CH_3)CH_2CH_2CH(CH_3)$ |

-continued

| Compound No. |  X | Y | $R_1R_2$ | $R_3R_4$ | $R_5R_6$ | $R_7R_8$ |
|---|---|---|---|---|---|---|
| [II]-(B)-(8) | 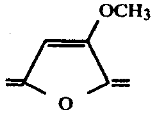 | $ClO_4$ | $CH_2CH_2OCH_2CH_2$ | $CH_2CH_2OCH_2CH_2$ | $CH_2CH_2OCH_2CH_2$ | $CH_2CH_2OCH_2CH_2$ |
| [II]-(B)-(9) | 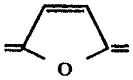 | $NO_3$ | $CH_2CH_2CH_2CH_2CH_2$ | $CH_2CH_2CH_2CH_2CH_2$ | $CH_2CH_2CH_2CH_2CH_2$ | $CH_2CH_2CH_2CH_2CH_2$ |
| [II]-(B)-(10) | 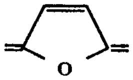 | $SbF_6$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ |
| [II]-(B)-(11) | 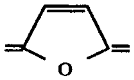 | $SbF_6$ | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [II]-(B)-(12) |  | $BF_4$ | $C_2H_4OH,C_2H_4OH$ | $C_2H_4OH,C_2H_4OH$ | $C_2H_4OH,C_2H_4OH$ | $C_2H_4OH,C_2H_4OH$ |
| [II]-(B)-(13) |  | $ClO_4$ | n-$C_4H_9,C_4H_9$ | n-$C_4H_9,C_4H_9$ | n-$C_4H_9,C_4H_9$ | n-$C_4H_9,C_4H_9$ |
| [II]-(B)-(14) |  | Br | $C_2H_5$ $C_2H_5$<br>$CH_2CHC_3H_7,CH_2CHC_3H_7$ | n-$C_4H_{11}$,n-$C_5H_{11}$ | n-$C_4H_{11}$,n-$C_5H_{11}$ | n-$C_4H_{11}$,n-$C_5H_{11}$ |
| [II]-(B)-(15) |  | $SbF_6$ | $CH_3$<br>$CHCH_2CH_2CH_2$ | $CH_3$<br>$CHCH_2CH_2CH_2$ | $CH_3$<br>$CHCH_2CH_2CH_2$ | $CH_3$<br>$CHCH_2CH_2CH_2$ |
| [II]-(B)-(16) |  | $ClO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |

-continued

| Compound No. |  X | Y | $R_1R_2$ | $R_3R_4$ | $R_5R_6$ | $R_7R_8$ |
|---|---|---|---|---|---|---|
| [II]-(B)-(17) | 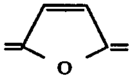 | I | $C_3H_6C{\equiv}CH,C_3H_6C{\equiv}CH$ | $C_3H_6C{\equiv}CH,C_3H_6C{\equiv}CH$ | $C_3H_6C{\equiv}CH,C_3H_6C{\equiv}CH$ | $C_3H_6C{\equiv}CH,C_3H_6C{\equiv}CH$ |
| [II]-(C)-(1) |  | $ClO_4$ | $C_2H_5,C_2H_5$ | $C_2H_5,C_2H_5$ | $C_2H_5,C_2H_5$ | $C_2H_5,C_2H_5$ |
| [II]-(C)-(2) | 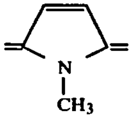 | $BF_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [II]-(C)-(3) | 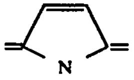 | $SbF_4$ | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [II]-(C)-(4) | 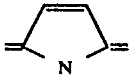 | Br | $CH_2CH(CH_3)C_2H_5,CH_2CH(CH_3)C_2H_5$ | $CH_2CH(CH_3)C_2H_5,CH_2CH(CH_3)C_2H_5$ | $CH_2CH(CH_3)C_2H_5,CH_2CH(CH_3)C_2H_5$ | $CH_2CH(CH_3)C_2H_5,CH_2CH(CH_3)C_2H_5$ |
| [II]-(C)-(5) | 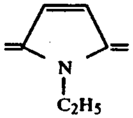 | $ClO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [II]-(C)-(6) | 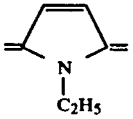 | $SbF_6$ | iso-$C_3H_7$,iso-$C_3H_7$ | iso-$C_3H_7$,iso-$C_3H_7$ | iso-$C_3H_7$,iso-$C_3H_7$ | iso-$C_3H_7$,iso-$C_3H_7$ |
| [II]-(C)-(7) | 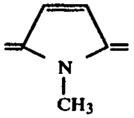 | $CH_3SO_4$ | $C_2H_4OC_4H_9,C_2H_4OC_4H_9$ | $C_2H_4OC_4H_9,C_2H_4OC_4H_9$ | $C_2H_4OC_4H_9,C_2H_4OC_4H_9$ | $C_2H_4OC_4H_9,C_2H_4OC_4H_9$ |

-continued

| Compound No. |  X | Y | $R_1R_2$ | $R_3R_4$ | $R_5R_6$ | $R_7R_8$ |
|---|---|---|---|---|---|---|
| [II]-(C)-(8) |  | $ClO_4$ | $CH_2CH{=}CH_2,CH_2CH{=}CH_2$ | $CH_2CH{=}CH_2,CH_2CH{=}CH_2$ | $CH_2CH{=}CH_2,CH_2CH{=}CH_2$ | $CH_2CH{=}CH_2,CH_2CH{=}CH_2$ |
| [II]-(C)-(9) | 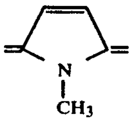 | $A_5F_8$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ |
| [II]-(C)-(10) | 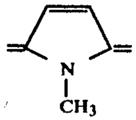 | $ClO_4$ | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [II]-(C)-(11) | 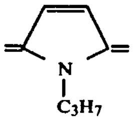 | $Cl^-$ | n-$C_{11}H_{23}$,n-$C_{11}H_{23}$ | n-$C_{11}H_{23}$,n-$C_{11}H_{23}$ | n-$C_{11}H_{23}$,n-$C_{10}H_{21}$ | n-$C_{11}H_{23}$,n-$C_{10}H_{21}$ |
| [II]-(C)-(12) | 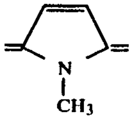 | $ClO_4$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ |
| [II]-(C)-(13) | 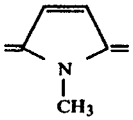 | $ClO_4$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ |
| [II]-(C)-(14) | 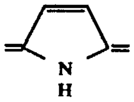 | $SbF_6$ | $C_2H_4OCH_3,C_2H_4OCH_3$ | $C_2H_4OCH_3,C_2H_4OCH_3$ | $C_2H_4OCH_3,C_2H_4OCH_3$ | $C_2H_4OCH_3,C_2H_4OCH_3$ |

-continued

| Compound No. |  | Y | $R_1R_2$ | $R_3R_4$ | $R_5R_6$ | $R_7R_8$ |
|---|---|---|---|---|---|---|
| [II]-(C)-(15) | 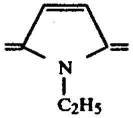 | 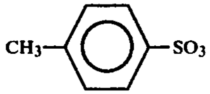 | $CH_2OC_2H_5,CH_2OC_2H_5$ | n-$C_4H_9$,n-$C_4H_9$ | $CH_2OC_2H_5,CH_2OC_2H_5$ | n-$C_4H_9$,n-$C_4H_9$ |
| [II]-(C)-(16) |  | $SbF_6$ | $\overset{CH_3}{\overset{\vert}{C}}HCH_2CH_2CH_2$ | $\overset{CH_3}{\overset{\vert}{C}}HCH_2CH_2CH_2$ | $\overset{CH_3}{\overset{\vert}{C}}HCH_2CH_2CH_2$ | $\overset{CH_3}{\overset{\vert}{C}}HCH_2CH_2CH_2$ |
| [II]-(C)-(17) | 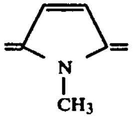 | $ClO_4$ | $\overset{Cl}{\overset{\vert}{C}}HCH_2CH_2\overset{Cl}{\overset{\vert}{C}}H$ | $\overset{Cl}{\overset{\vert}{C}}HCH_2CH_2\overset{Cl}{\overset{\vert}{C}}H$ | $\overset{Cl}{\overset{\vert}{C}}HCH_2CH_2\overset{Cl}{\overset{\vert}{C}}H$ | $\overset{Cl}{\overset{\vert}{C}}HCH_2CH_2\overset{Cl}{\overset{\vert}{C}}H$ |
| [II]-(C)-(18) | 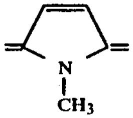 | $ClO_4$ | $CH_2CH_2OCH_2CH_2$ | $CH_2CH_2OCH_2CH_2$ | $CH_2CH_2OCH_2CH_2$ | $CH_2CH_2OCH_2CH_2$ |
| [II]-(C)-(19) | 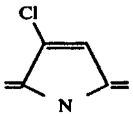 | $AsF_5$ | $CH{=}C(CH_3)CH_2C(CH_3)_2CH_2$ | $CH{=}C(CH_3)CH_2C(CH_3)_2CH_2$ | $CH{=}C(CH_3)CH_2C(CH_3)_2CH_2$ | $CH{=}C(CH_3)CH_2C(CH_3)_2CH_2$ |
| [II]-(D)-(1) | 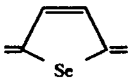 | $AsF_6$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [II]-(D)-(2) | 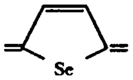 | $BF_4$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ |
| [II]-(D)-(3) |  | $SbF_6$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ |

-continued

| Compound No. |  | Y | $R_1R_2$ | $R_3R_4$ | $R_5R_6$ | $R_7R_8$ |
|---|---|---|---|---|---|---|
| [II]-(D)-(4) | 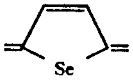 | Br | $C_2H_4\overset{CH_3}{\overset{\vert}{C}}HCH_3, C_2H_4\overset{CH_3}{\overset{\vert}{C}}HCH_3$ | $C_2H_4\overset{CH_3}{\overset{\vert}{C}}HCH_3, C_2H_4\overset{CH_3}{\overset{\vert}{C}}HCH_3$ | $C_2H_4\overset{CH_3}{\overset{\vert}{C}}HCH_3, C_2H_4\overset{CH_3}{\overset{\vert}{C}}HCH_3$ | $C_2H_4\overset{CH_3}{\overset{\vert}{C}}HCH_3, C_2H_4\overset{CH_3}{\overset{\vert}{C}}HCH_3$ |
| [II]-(D)-(5) | 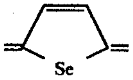 | $ClO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [II]-(D)-(6) | 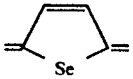 | $SbF_6$ | iso-$C_3H_7$,iso-$C_3H_7$ | iso-$C_3H_7$,iso-$C_3H_7$ | iso-$C_3H_7$,iso-$C_3H_7$ | iso-$C_3H_7$,iso-$C_3H_7$ |
| [II]-(D)-(7) | 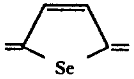 | $CH_2SO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [II]-(D)-(8) | 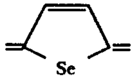 | $ClO_4$ | $CH_2CH{=}CH_2,CH_2CH{=}CH_2$ | $CH_2CH{=}CH_2,CH_2CH{=}CH_2$ | $CH_2CH{=}CH_2,CH_2CH{=}CH_2$ | $CH_2CH{=}CH_2,CH_2CH{=}CH_2$ |
| [II]-(D)-(9) | 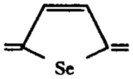 | $AsF_6$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ | $C_2H_4CH{=}CH_2,C_2H_4CH{=}CH_2$ |
| [II]-(D)-(10) |  | $ClO_4$ | n-$C_4H_9$,n-$C_4H_9$ | n-$C_4H_9$,n-$C_4H_9$ | n-$C_4H_9$,n-$C_4H_9$ | n-$C_4H_9$,n-$C_4H_9$ |
| [II]-(D)-(11) | 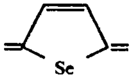 | $SbF_6$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ |
| [II]-(D)-(12) |  | $ClO_4$ | n-$C_3H_7$,n-$C_3H_7$ | n-$C_3H_7$,n-$C_3H_7$ | n-$C_5H_{11}$,n-$C_5H_{11}$ | n-$C_5H_{11}$,n-$C_5H_{11}$ |

-continued

| Compound No. |  | Y | $R_1R_2$ | $R_3R_4$ | $R_5R_6$ | $R_7R_8$ |
|---|---|---|---|---|---|---|
| [II]-(D)-(13) | 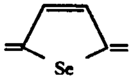 | I | $C_3H_7OH,C_3H_7OH$ | $C_3H_7OH,C_3H_7OH$ | $C_3H_7OH,C_3H_7OH$ | $C_3H_7OH,C_3H_7OH$ |
| [II]-(D)-(14) | 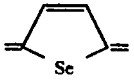 | $ClO_4$ | $C_2H_5,C_2H_5$ | $C_2H_5,C_2H_5$ | $C_2H_5,C_2H_5$ | $C_2H_5,C_2H_5$ |
| [II]-(D)-(15) | 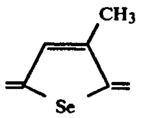 | Br | $CH_2CH(C_2H_5)C_3H_7,CH_2CH(C_2H_5)C_3H_7$ | $n-C_5H_{11},n-C_5H_{11}$ | $n-C_5H_{11},n-C_5H_{11}$ | $n-C_5H_{11},n-C_5H_{11}$ |
| [II]-(D)-(16) |  | $SbF_6$ | $CH(CH_3)CH_2CH_2CH_2$ | $CH(CH_3)CH_2CH_2CH_2$ | $CH(CH_3)CH_2CH_2CH_2$ | $CH(CH_3)CH_2CH_2CH_2$ |
| [II]-(D)-(17) | 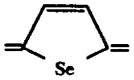 | $ClO_4$ | $C_2H_4OCH_3,C_2H_4OCH_3$ | $C_2H_4OCH_3,C_2H_4OCH_3$ | $C_2H_4OCH_3,C_2H_4OCH_3$ | $C_2H_4OCH_3,C_2H_4OCH_3$ |
| [II]-(D)-(18) | 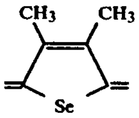 | 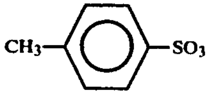 | $C_2H_6C\equiv CH,C_2H_6C\equiv CH$ | $C_2H_6C\equiv CH,C_2H_6C\equiv CH$ | $C_2H_6C\equiv CH,C_2H_6C\equiv CH$ | $C_2H_6C\equiv CH,C_2H_6C\equiv CH$ |
| [II]-(D)-(19) | 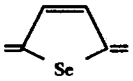 | $SbF_6$ | $CH_2CH_2OCH_2CH_2$ | $CH_2CH_2OCH_2CH_2$ | $CH_2CH_2OCH_2CH_2$ | $CH_2CH_2OCH_2CH_2$ |
| [II]-(E)-(1) | 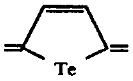 | $ClO_4$ | $n-C_4H_9,n-C_4H_9$ | $n-C_4H_9,n-C_4H_9$ | $n-C_4H_9,n-C_4H_9$ | $n-C_4H_9,n-C_4H_9$ |
| [II]-(E)-(2) | 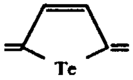 | $ClO_4$ | $C_2H_4CH=CH_2,C_2H_4CH=CH_2$ | $C_2H_4CH=CH_2,C_2H_4CH=CH_2$ | $C_2H_4CH=CH_2,C_2H_4CH=CH_2$ | $C_2H_4CH=CH_2,C_2H_4CH=CH_2$ |

-continued

| Compound No. | X | Y | $R_1R_2$ | $R_3R_4$ | $R_5R_6$ | $R_7R_8$ |
|---|---|---|---|---|---|---|
| |  | | | | | |
| [II]-(E)-(3) | 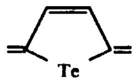 | $ClO_4$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ | $C_2H_4OC_2H_5,C_2H_4OC_2H_5$ |
| [II]-(E)-(4) | 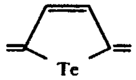 | $SbF_6$ | $C_2H_4OCH_3,C_2H_4OCH_3$ | $C_2H_4OCH_3,C_2H_4OCH_3$ | $C_2H_4OCH_3,C_2H_4OCH_3$ | $C_2H_4OCH_3,C_2H_4OCH_3$ |
| [II]-(E)-(5) | 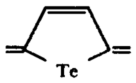 | 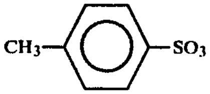 | $C_2H_6OC_2H_5,C_3H_6OC_2H_5$ | n-$C_4H_9$,n-$C_4H_9$ | $C_2H_6OC_2H_5,C_3H_6OC_2H_5$ | n-$C_4H_9$,n-$C_4H_9$ |
| [II]-(E)-(6) | 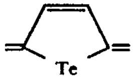 | $SbF_6$ | $CH_3$ $CH_3$<br>$CHCH_2CH_2CH$ | $CH_2CH_2CH_2CH_2$ | $CH_3$ $CH_3$<br>$CHCH_2CH_2CH$ | $CH_2CH_2CH_2CH_2$ |
| [II]-(E)-(7) | 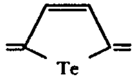 | $ClO_4$ | $CH_3$<br>$CHCH_2CH_2CH_2$ | $CH_3$<br>$CHCH_2CH_2CH_2$ | $CH_3$<br>$CHCH_2CH_2CH_2$ | $CH_3$<br>$CHCH_2CH_2CH_2$ |
| [II]-(E)-(8) | 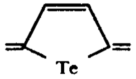 | $ClO_4$ | $CH_2CH_2OCH_2CH_2$ | $CH_2CH_2OCH_2CH_2$ | $CH_2CH_2OCH_2CH_2$ | $CH_2CH_2OCH_2CH_2$ |
| [II]-(E)-(9) | 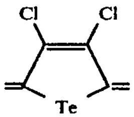 | $NO_3$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |
| [II]-(E)-(10) | 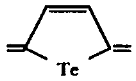 | $ClO_4$ | $C_6H_4Cl,C_6H_4Cl$ | $C_6H_4Cl,C_6H_4Cl$ | $C_6H_4Cl,C_6H_4Cl$ | $C_6H_4Cl,C_6H_4Cl$ |
| [II]-(E)-(11) | 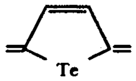 | $ClO_4$ | n-$C_3H_7$,n-$C_3H_7$ | n-$C_3H_7$,n-$C_3H_7$ | n-$C_3H_7$,n-$C_3H_7$ | n-$C_3H_7$,n-$C_3H_7$ |

-continued

| Compound No. | X | Y | $R_1R_2$ | $R_3R_4$ | $R_5R_6$ | $R_7R_8$ |
|---|---|---|---|---|---|---|
| |  | | | | | |
| [II]-(E)-(12) | 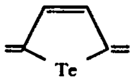 | $ClO_4$ | $CH(CH_3)CH_2CH_2CH(CH_3)$ | $CH(CH_3)CH_2CH_2CH(CH_3)$ | $CH(CH_3)CH_2CH_2CH(CH_3)$ | $CH(CH_3)CH_2CH_2CH(CH_3)$ |
| [II]-(E)-(13) | 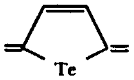 | $BF_4$ | $CH_2Cl,CH_2Cl$ | $CH_2Cl,CH_2Cl$ | $CH_2Cl,CH_2Cl$ | $CH_2Cl,CH_2Cl$ |
| [II]-(E)-(14) | 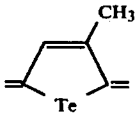 | Br | $C_2H_4Br,C_2H_4Br$ | $C_2H_4Br,C_2H_4Br$ | $C_2H_4Br,C_2H_4Br$ | $C_2H_4Br,C_2H_4Br$ |
| [II]-(E)-(15) | 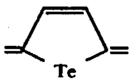 | $ClO_4$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ | $CH{=}C(CH_2)CH_2C(CH_2)_2CH_2$ |
| [II]-(E)-(16) | 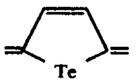 | $SbF_6$ | $CH_2CH{=}CH_2,CH_2CH{=}CH_2$ | $CH_2CH{=}CH_2,CH_2CH{=}CH_2$ | $CH_2CH{=}CH_2,CH_2CH{=}CH_2$ | $CH_2CH{=}CH_2,CH_2CH{=}CH_2$ |

The infrared-absorptive compound of the present invention as described above has an absorption peak with the maximum absorption wavelength of 900 nm or more and with an absorbance coefficient of approximately tens of thousands to hundreds of thousands.

The infrared-absorptive compound of the present invention is very effective when used into optical recording mediums such as optical disks or optical cards. That is, incorporation of the infrared-absorptive compound of the present invention in a recording layer enables the recording layer to be free from deterioration due to heat or light, and an optical recording medium free from the lowering of recording-reproducing performance due to long-term use or long-term storage.

The optical recording medium of the present invention comprises, as shown in FIG. 1, a substrate 1 and a recording layer 2 provided thereon. On the recording layer 2, pits are formed using a laser energy. Information is recorded on the recording layer 2 in the form of arrangement of pits. The pits are cavities or areas having changed in optical density as a result of irradiation of laser light energy The pits formed on the recording layer 2 can be read out by the laser light reflection therefrom.

The recording layer 2 contains an organic coloring matter and the infrared-absorptive compound(s) of the present invention. One or more kinds of the infrared-absorptive compound of the present invention can be contained in the recording layer 2. The organic coloring matter may include, for example, anthraquinone derivatives (those having an indanthrene skeleton in the main chain), dioxazine compounds and derivatives thereof, triphenodithiazine compounds, phenanthrene derivatives, cyanine compounds, merocyanine compounds, pyrylium compounds, xanthene compounds, triphenylmethane compounds, croconium compounds, azo dyes, croconics, azines, indigoids, methine dyes, polymethine dyes, azulene dyes, squarium dyes, sulfur dyes, and dithiolate complexes of metals.

The present invention is particularly effective for an optical recording medium when a cationic coloring matter, as shown below, is used.

The cationic coloring matter may include the following:

Polymethine dye represented by Formula (III):

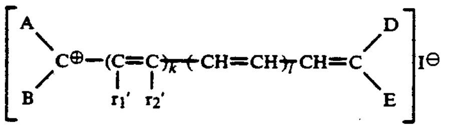

(III)

wherein, A, B, D and E each represent a hydrogen atom or a group selected from an alkyl group having 2 or more carbon atoms, an alkenyl group, an aralkyl group, an aryl group, a styryl group and a heterocyclic group; $r_1'$ and $r_2'$ each represents a group selected from an alkyl group, a cyclic alkyl group, an alkenyl group, an aralkyl group and an aryl group; and k represents 0 or 1; l, 0, 1 or 2; and $I^{\ominus}$, an anion.

The aralkyl groug, aryl group, styryl group or heterocyclic group in the definition for A, B, C, D, E, $r_1'$ and $r_2'$ may have a substituent. Dye represented by Formula (IV):

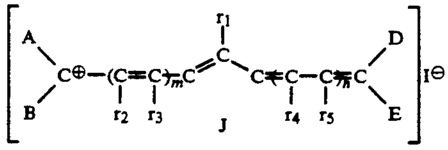

(IV)

wherein A, B, D, E and $I^{\ominus}$ are as defined above; $r_1$ to $r_5$ each represents a hydrogen atom, a halogen atom, an alkyl group or an aryl group; J represents a divalent group having atoms necessary for completing a ring of 5 or 6 members; m and n each represents 0, 1 or 2.

Dye represented by Formula (V):

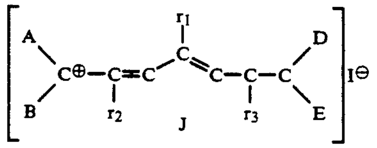

(V)

wherein A, B, D, E, $r_2$, $r_3$, J and $I^{\ominus}$ are as defined above.

Dye represented by Formula (VI):

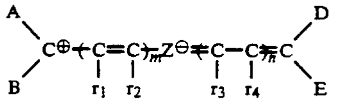

(VI)

wherein A, B, D, E, $r_1$, $r_2$, $r_3$, $r_4$, m and n are as defined above, and $Z^{\ominus}$ represents

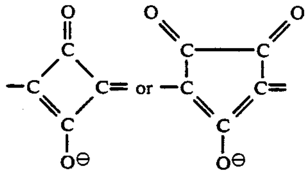

Azulenium dye represented by Formula (VII), (VIII) or (IX):

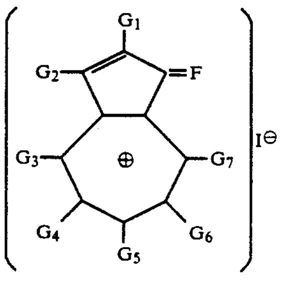

(VII)

-continued (VIII)

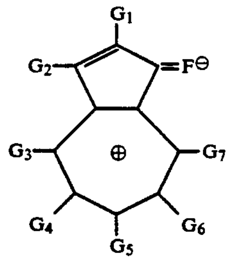

(IX)

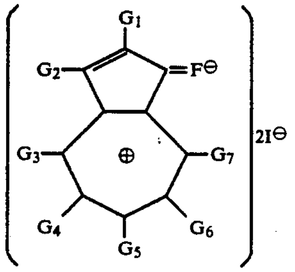

Herein, $G_1$ to $G_7$ each represents a hydrogen atom, a halogen atom (including a chlorine atom, a bromine atom and an iodine atom) or a monovalent organic residual group. The monovalent organic group can be selected from the groups covering a wide range.

A substituted or unsubstituted condensed ring may also be formed by at least one combination between $G_1$ and $G_2$, $G_2$ and $G_3$, $G_3$ and $G_4$, $G_4$ and $G_5$, $G_5$ and $G_6$, and $G_6$ and $G_7$. The formed ring includes 5, 6 or 7 members rings, including aromatic rings such as benzene, naphthalene, chlorobenzene, bromobenzene, methyl benzene, ethylbenzene, methoxybenzene and ethoxybenzene, heterocyclic rings such as a furan ring, a benzofuran ring, a pyrrol ring, a rhiophene ring, a pyridine ring, a quinoline ring and a thiazole ring, and aliphatic rings when such ring-forming G groups represent dimethylene, trimethylene and tetramethylene.

$I^{\ominus}$ is as defined above and represents an anion.

F represents a divalent organic residual group combined through a double bond. Specific examples in the present invention, containing such F, may include those represented respectively by Formulas (1) to (11). In the formulas, $Q_{\oplus}$ represents an azulenium salt nucleus shown below, and the remainder of the structure represents F.

Azulenium salt nucleus ($Q^{\oplus}$):

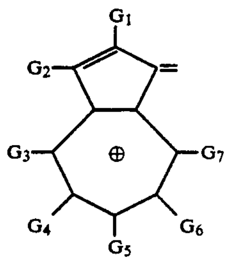

Formula:

(1)

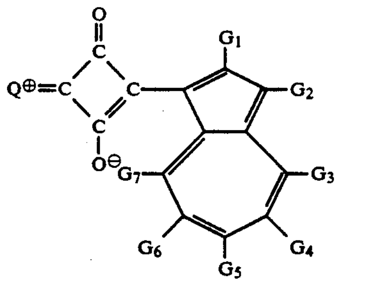

(2)

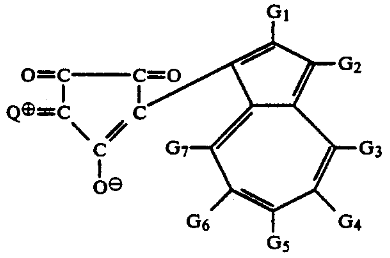

(3)

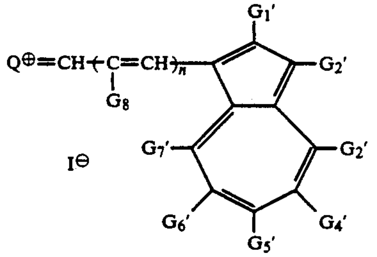

$G_1'$ to $G_7'$ are as defined for $G_1$ to $G_7$.

Also, the azulenium salt nucleus represented by $Q^{\oplus}$ and the azulene salt nucleus at the right side in the above Formula (3) may be symmetrical or unsymmetrical.

(4)

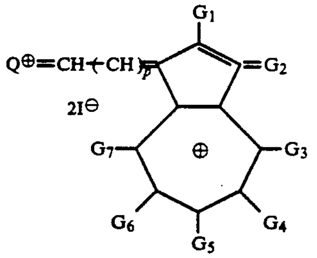

(5)

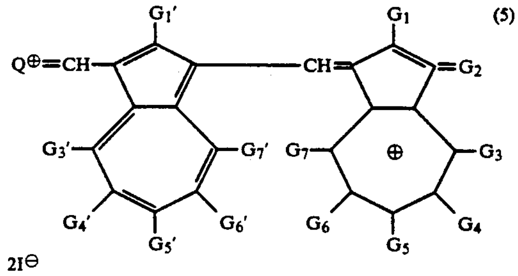

(6)

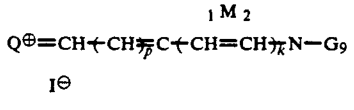

-continued

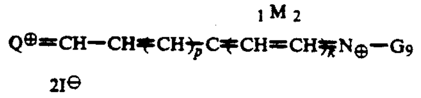
(7)

In the formulas, $_1M_2$ represents a group of non-metal atoms necessary for completing a nitrogen-containing heterocyclic ring.

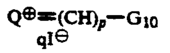
(8)

In the formula, $G_{10}$ represents a substituted or unsubstituted aryl group or a cationic group thereof. P Represents an integer of 1 to 8 and q is 1 or 2.

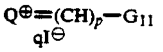
(9)

In the formula $G_{11}$ represents a heterocyclic group or a cationic group thereof.

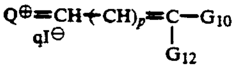
(10)

In the formula, $G_{12}$ represents a hydrogen atom, an alkyl group or a substituted or unsubstituted aryl group.

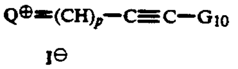
(11)

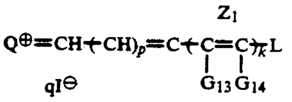
(11)

In the formula, $Z_2$ represents a group of atoms necessary for completing a pyran, thiapyran, selenapyran, telluropyran, benzopyran, benzothiapyran, benzoselenapyran, benzotelluropyran, naphthopyran, naphthothiopyran or naphthotelluropyran ring that may be substituted.

L represents a sulfur atom, an oxygen atom, a selenium atom or a tellurium atom.

$G_{13}$ and $G_{14}$ each represents a hydrogen atom, an alkoxyl group, a substituted or unsubstituted aryl group, an aralkenyl group or a heterocyclic group.

Preferable coloring matters include the dyes represented respectively by Formulas (X), (XI), (XII) and (XIII).

Formula (X)

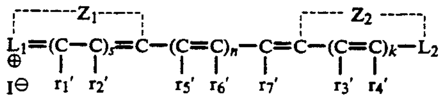

Formula (XI)

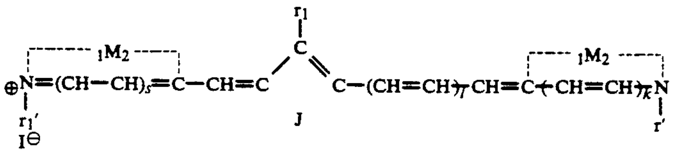

Formula (XII)

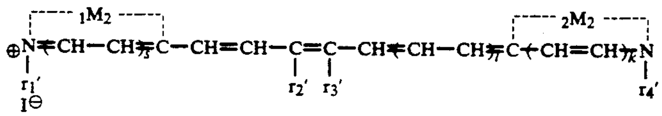

Formula (XIII

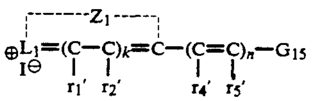

In the above Formulas (X), (XI), (XII) and (XIII), $L_1$ and $L_2$ each represents a substituted nitrogen atom, sulfur atom, oxygen atom, selenium atom or tellurium atom: $Z_1$ represents a group of atoms necessary for completing pyrylium, thiopyrylium, selenapyrylium, telluropyrylium, benzopyrylium, benzothiopyrylium, benzoselenapyrylium, benzotelluropyrylium, naphthopyrylium, naphthothiopyrylium, naphthoselenapyrylium or naphthotelluropyrylium that may be substituted; $Z_2$ represents a group of atoms necessary for completing pyran, thiopyran, selenapyran, telluropyran, benzopyran, benzothiopyran, benzoselenapyran, benzotelluropyran, naphthopyran, naphthothiopyran, naphthoselenapyran or naphthotelluropyran that may be substituted. Symbol s is 0 or 1. $G_{15}$ represents a substituted or unsubstituted aryl group or a substituted or unsubstituted heterocyclic group. (Symbols $r_3'$ to $r_7'$ are as defined for $r_1'$ and $r_2'$ described above.)

Symbols k, n, M, $r_1'$, $r_2'$, $r_1$, J, $Z^{\ominus}$ and $I^{\ominus}$ are as defined above.

Symbols in the above formulas will be defined below in greater detail.

A, B, D and E each represents a hydrogen atom or an alkyl group (for example, a methyl group, an ethyl group, a n-propyl group, an iso-propyl group, a n-butyl group, a sec-butyl group, an iso-butyl group, a t-butyl group, a n-amyl group, a t-amyl group, a n-hexyl group a n-octyl group, a t-octyl group). including other alkyl groups as exemplified by substituted alkyl groups for example, a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, a N-(methylsulfonyl)-carbamylmethyl group, a 3-(acetylsulfamyl)propyl group, a 4-(acetylsulfamyl)butyl group), cyclic alkyl groups (for example, a cyclohexyl group), alkenyl groups (for example, a vinyl group, a propenyl group, a butenyl group, a pentenyl group, a hexenyl group, a heptenyl group, an octenyl group, a dodecenyl group, a pulenyl group), aralkyl groups (for example, a benzyl group, a phenethyl group, an α-naphthylmethyl group, a β-naphthylmethyl group), substituted aralkyl groups (for example, a carboxybenzyl group, a sulfobenzyl group, a hydroxybenzyl group). $G_1$, $G_2$, $G_3$, $G_4$ and $G_5$ each represents a substituted or unsubstituted aryl group (for example a phenyl group, a naphthyl group, a tolyl group, a xylyl group a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group), a substituted or unsubstituted heterocyclic group (for example, a pyridyl group, a quinolyl group, a lepidyl group, a methylpyridyl, a furyl group, a thienyl group, an indolyl group, a pyrrolyl group, a carbazolyl group, an N-ethylcarbazolyl group) or a substituted or unsubstituted styryl group (for example, a styryl group, a methoxystyryl group, a dimethoxystyryl group, a trimethoxystyryl group, an ethoxystyryl group, a dimethylaminostyryl group, a diethylaminostyryl group, a dipropylaminostyryl group, a dibenzylaminostyryl group, a diphenylaminostyryl group, a 2,2-diphenylvinyl group, a 2-phenyl-2-methylvinyl group, a 2-(dimethylaminophenyl)-2-phenylvinyl group, a 2-(diethylaminophenyl)-2-phenylvinyl group, a 2-(dibenzylaminophenyl)-2-phenylvinyl group a 2,2-(diethylaminophenyl)vinyl group, a 2,2-di(methoxyphenyl)vinyl group, a 2,2-di(ethoxyphenyl)vinyl group, a 2-(dimethylaminophenyl)-2-methylvinyl group, a 2-(diethylaminophenyl)-2-ethylvinyl group.

Symbols $r_1'$, $r_2'$, $r_3'$, $r_4'$, $r_5'$, $r_6'$ and $r_7'$ each represents a hydrogen atom or an alkyl group (for example, a methyl group, an ethyl group, a n-propyl group, an iso-propyl group, a n-butyl group, a sec-butyl group, an iso-butyl group, a t-butyl group, a n-amyl group, a t-amyl group, a n-hexyl group, a n-octyl group, t-octyl group), including other alkyl groups as exemplified by substituted alkyl groups (for example, a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, a N-(methylsulfonyl)-carbamylmethyl group, a 3-(acetylsulfamyl)propyl group, a 4-(acetylsulfamyl)butyl group), cyclic alkyl groups (for example, a cyclohexyl group), alkenyl groups (for example, a vinyl group, a propenyl group, a butenyl group, a pentenyl group, a hexenyl group, a heptenyl group, an octenyl group, a dodecenyl group, a pulenyl group), aralkyl groups (for example, a benzyl group, a phenethyl group, an α-naphthylmethyl group, a β-naphthylmethyl group), substituted aralkyl groups (for example, a carboxybenzyl group, a sulfobenzyl group, a hydroxybenzyl group). $G_1$, $G_2$, $G_3$, $G_4$ and $G_5$ each represents a substituted or unsubstituted aryl group (for example, a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group); $r_1$, $r_2$, $r_3$, $r_4$ and $r_5$ each represents a hydrogen atom, a halogen atom such as a chlorine atom, a bromine atom or an iodine atom, an alkyl group such as methyl, ethyl, n-propyl, iso-propyl, n-butyl, t-butyl n-amyl n-hexyl n-octyl 2-ethylhexyl or t-octyl), an alkoxy group such as methoxy, ethoxy, propoxy or butoxy or a substituted or unsubstituted aryl group such as phenyl, tolyl, xylyl, ethylphenyl, methoxyphenyl, ethoxyphenyl, chlorophenyl, nitrophenyl, dimethylaminophenyl, α-naphthyl or β-naphthyl. J represents a divalent hydrocarbon group as exemplified by $$-CH_2-CH_2-,\ -(CH_2)_3-,\ -CH_2-C(CH_3)_2-CH_2-,$$

$$-CH{=}CH-,\ \text{or}\ -CH_2-CH(Cl)-CH_2-,$$

and the 5-membered ring or 6-membered ring of these may be condensed with a benzene ring, a naphthalene ring or the like.

$G_1$ to $G_7$ and $G_1'$ to $G_7'$ each represents an atom or group including a hydrogen atom and a halogen atom such as a chlorine atom, a bromine atom or an iodine atom, as well as an alkyl group such as methyl, ethyl, n-propyl, iso-propyl, n-butyl, t-butyl, n-amyl, n-hexyl, n-octyl, 2-ethylhexyl or t-octyl, an alkoxy group such as methoxy, ethoxy, propoxy or butoxy, a substituted or unsubstituted aryl group such as phenyl, tolyl, xylyl, ethylphenyl, methoxyphenyl, ethoxyphenyl, chlorophenyl, nitrophenyl, dimethylaminophenyl, α-naphthyl or β-naphthyl, a substituted or unsubstituted aralkyl group such as benzyl, 2-phenylethyl, 2-phenyl-1-methylphenyl, bromobenzyl, 2-bromophenylethyl, methylbenzyl, methoxybenzyl or nitrobenzyl, an acyl group such as acetyl, propionyl, butyryl, valeryl, benzoyl, tolyloyl, naphthoyl, phthaloyl or furoyl, a substituted or unsubstituted amino group such as amino, dimethylamino, diethylamino, dipropylamino, acetylamino or benzoyl amino, a substituted or unsubstituted styryl group such as styryl, dimethylaminostyryl, diethylaminostyryl, dipropylaminostyryl, methoxystyryl, ethoxystyryl or methylstyryl, a nitro group, a hydroxyl group, a carboxyl group, a cyano group or a substituted or unsubstituted arylazo group such as phenylazo, α-naphthylazo, β-naphthylazo, dimethylaminophenylazo, chlorophenylazo, nitrophenylazo, methoxyphenylazo or tolylazo.

$G_1'$ to $G_7'$ may also form a condensed ring as in the case of $G_1$ to $G_7$.

$G_8$ represents a hydrogen atom, a nitro group, a cyano group, an alkyl group such as methyl, ethyl group, propyl or butyl, or an aryl group such as phenyl, tolyl or xylyl.

$G_9$ represents an alkyl group such as methyl, ethyl, propyl or butyl, a substituted alkyl group (2-hydroxyethyl, 2-methoxyethyl, 2-ethoxyethyl, 3-hydroxypropyl, 3-methoxypropyl, 3-ethoxypropyl, 3-chloropropyl, 3-bromopropyl or 3-carboxypropyl, a cyclic alkyl group such as cyclohexyl or cyclopropyl, an arylaralkyl group such as benzyl, 2-phenylethyl, 3-phenylpropyl, 4-phenylbutyl, α-naphtylmethyl or β-naphtylmethyl, a substituted aralkyl group such as methylbenzyl, ethylbenzyl, dimethylbenzyl, trimethylbenzyl, chlorobenzyl or bromobenzyl, an aryl group such as phenyl, tolyl, xylyl, α-naphthyl or β-naphthyl, or a substituted aryl group such as chlorophenyl, dichlorophenyl, trichlorophenyl, ethylphenyl, methoxyphenyl, dimethoxyphenyl, aminophenyl, nitrophenyl or hydroxyphenyl.

$G_{10}$ represents a substituted or unsubstituted aryl group such as phenyl, tolyl, xylyl, biphenyl, α-naphthyl, β-naphthyl, anthranyl, pyrenyl, methoxyphenyl, dimethoxyphenyl, trimethoxyphenyl, ethoxyphenyl, diethoxyphenyl, chlorophenyl, dichlorophenyl, trichlorophenyl bromophenyl, dibromophenyl, tribromophenyl, ethylphenyl, diethylphenyl, nitrophenyl, aminophenyl, dimethylaminophenyl, diethylaminophenyl, dibenzylaminophenyl, dipropylaminophenyl, morpholinophenyl, piperidinylphenyl, piperazinophenyl, diphenylaminophenyl, acetylaminophenyl, benzoylaminophenyl, acetylphenyl, benzoylphenyl or cyanophenyl.

$G_{11}$ represents a monovalent heterocyclic group derived from a heterocyclic ring such as furan, thiophene, benzofuran, thionaphthene, dibenzofuran, carbazole, phenothiazine, phenoxazine or pyridine.

$G_{12}$ represents a hydrogen atom, an alkyl group such as methyl, ethyl, propyl or butyl, or a substituted or unsubstituted aryl group such as phenyl, tolyl, xylyl, biphenyl, ethylphenyl, chlorophenyl, methoxyphenyl, ethoxyphenyl, nitrophenyl, aminophenyl, dimethylaminophenyl, diethylaminophenyl, acetylaminophenyl, α-naphthyl, β-naphthyl, anthralyl or pyrenyl.

$G_{13}$ and $G_{14}$ each represents a hydrogen atom, an alkyl group such as methyl, ethyl, propyl or butyl, an alkoxy group such as methoxy, ethoxy, propoxy, ethoxyethyl or methoxyethyl, an aryl group such as phenyl, tolyl, xylyl, chlorophenyl, biphenyl or methoxyphenyl, a substituted or unsubstituted styryl group such as styryl, p-methoxystyryl, o-chlorostyryl or p-methoxystyryl, substituted or unsubstituted 4-phenyl-1,3-butadienyl group such as 4-phenyl-1,3-butadienyl or 4-(p-methylphenyl)-1,3-butadienyl, or a substituted or unsubstituted heterocyclic ring such as quinolyl, pyridyl, carbazolyl or furyl.

${}_1M_2$ represents a group of atoms necessary for completing a nitrogen-containing heterocyclic ring such as pyridine, thiazole, benzothiazole, naphthothiazole, oxazole, benzoxazole, naththoxazole, imidazole, benzimidazole, naphthoimidazole, 2-quinoline, 4-quinoline, isoquinoline or indole, and may be substituted with a halogen atom such as a chlorine atom, a bromine atom or an iodine atom, an alkyl group such as methyl, ethyl, propyl or butyl, an aryl group such as phenyl, tolyl or xylyl, or an aralkyl group such as benzyl or p-tolylmethyl.

Symbols $r_1'$ to $r_7'$ each represents a hydrogen atom, a substituted or unsubstituted alkyl group such as methyl, ethyl, propyl, isopropyl, butyl, t-butyl, amyl, isoamyl, hexyl, octyl, nonyl, dodecyl, methoxyethyl, hydroxyethyl or carboxypropyl, a substituted or unsubstituted aryl group such as phenyl, α-naphthyl, β-naphthyl, tolyl, xylyl, biphenyl, ethylphenyl, methoxyphenyl, ethoxyphenyl, dimethoxyphenyl, hydroxyphenyl, chloroxyphenyl, dichlophenyl, bromophenyl, dibromophenyl, nitrophenyl, diethylaminophenyl, dimethylaminophenyl or dibenzylaminophenyl, a substituted or unsubstituted aralkyl group such as benzyl, phenetyl, 3-phenylpropyl, methoxybenzyl, methylbenzyl or chlorobenzyl.

Symbols k and s each are 0 or 1, and l, m, n each are 1 or 2.

$I^{\ominus}$ is an anion, representing a chloride ion, a bromide ion, an iodide ion, a perchlorate ion, a benzenesulfonate ion, a p-toluenesulfonate ion, a methylsulfate ion, an ethylsulfate ion, a propylsulfate ion, a tetrafluoroborate ion, a tetraphenylborate ion, a hexafluorophosphate ion, a benzenesulfinate ion, an acetate ion, a trifluoroacetate ion, a propionate ion, a benzoate ion, an oxalate ion, a succinate ion, a malonate ion, an oleate ion, a stearate ion, a citrate ion, a monohydrogendiphosphate ion, a dihydrogenmonophosphate ion, a pentachlorostanate ion, a chlorosulfonate ion, a fluorosulfonate ion, a trifluoromethanesulfonate ion, a hexanefluoroantimonate ion, a molybdate ion, a tungstate, a titanate ion, a zirconate ion, or the like.

In addition to the organic coloring matter and the infrared-absorptive compound, the recording layer 2 may also contain a binder. As the binder, it is possible to use, for example, cellulose esters such as nitrocellulose, cellulose phosphate, cellulose sulfate, cellulose acetate, cellulose propionate, cellulose butyrate, cellulose myristate, cellulose palmitate, cellulose acetate.propionate and cellulose acetate.butyrate, cellulose ethers such as methyl cellulose, ethyl cellulose, propyl cellulose and butyl cellulose, vinyl resins such as polystyrene, polyvinyl chloride, polyvinyl acetate, polyvinyl butyral, polyvinyl acetal, polyvinyl alcohol and polyvinyl pyrrolidone, copolymer resins such as a styrene-butadiene copolymer, a styrene-butadiene-acrylonitrile copolymer, a styrene-acrylonitrile copolymer and a vinyl chloride-vinyl acetate copolymer, acrylic resins such as polymethyl methacrylate, polymethyl acrylate, polybutyl acrylate, polyacrylic acid, polymethacrylic acid, polyacrylamide and polyacrylonitrile, polyesters such as polyethylene terephthalate, polyarylates such as poly(4,4'-isopropylidenediphenylene-co-1,4-cyclohexylenedimethylene carbonate), poly(ethylenedioxy-3,3'- phenylene thiocarbonate, poly(4,4'-isopropylidenediphenylene carbonate-coterephthalate), poly(4,4'-isopropylidenediphenylene carbonate), poly(4,4'-sec-butylidenediphenylene carbonate) and poly(4,4'-isopropylidenediphenylene-block-oxyethylene, polyamides, polyimides, epoxy resins, phenol resins, and polyolefins such as polyethylene, polypropylene and chlorinated polyethylene.

The recording layer 2 may preferably contain the organic coloring matter in an amount of from 40 to 99% by weight, and more preferably from 70 to 99% by weight. The infrared-absorptive compound of the present invention may preferably be contained in an amount of from 1 to 60% by weight, more preferably from 5 to 40% by weight, and particularly preferably from 5 to 30% by weight, based on the weight of the recording layer 2. When the recording layer 2 contains the binder, the binder may preferably be in a content of not more than 10% by weight. The recording layer 2 may preferably be in a thickness of from 50 Å to 100 μm, and more preferably from 200 Å to 1 μm.

The recording layer 2 may contain a surface active agent, an antistatic agent, a stabilizer, a dispersible flame retardant, a lubricant, a plasticizer and so forth.

Figure 2:
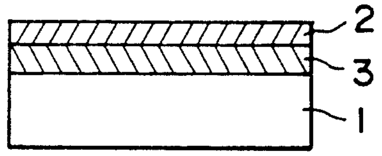
FIGS. 2 to 4 are cross-sectional illustrations of other examples of the optical recording medium according to the present invention.
Figure 3:
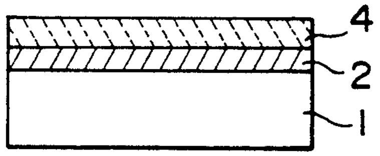
Figure 4:
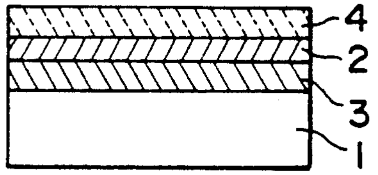

As shown in FIGS. 2 to 4, a subbing layer 3 may also be provided between the recording layer 2 and the substrate 1, or a protective layer 4 on the recording layer 2.

The subbing layer 3 is provided to impart solvent resistance, improve reflectance or improve repeating reproducing performance. The protective layer 4 is provided to protect the recording layer from scratches, dust, soil, etc and give an environmental stability to the recording layer 2. As materials used therefor, inorganic compounds, metals or organic polymeric compounds are mainly used. As the inorganic compounds, it is possible to use, for example, $SiO_2$, $MgF_2$, SiO, $TiO_2$, ZnO, TiN and SiN; as the metals, for example, Zn, Cu, Ni, Al, Cr, Ge, Se and Cd; and as the organic polymeric compounds, for example, ionomer resins, polyamide resins, vinyl resins, natural polymers, epoxy resins, silane coupling agents, silicone resins and liquid rubber.

As the substrate 1, it is possible to use, for example, plastics of polyesters, polycarbonates, acrylic resins, polyolefin resins, phenol resins, epoxy resins, polyamides, polyimides or the like, glasses, or metals.

The optical recording medium of the present invention can be produced by coating the substrate surface with a coating solution prepared by dispersing or dissolving the materials for the recording layer 2 in an organic solvent.

The coating can be carried out using a coating process such as dip coating, spray coating, spin coating, bead coating, wire bar coating, blade coating, roller coating or curtain coating.

The organic solvent used in the coating may differ depending on whether a dispersion or a solution is formed. It is commonly possible to use alcohols such as methanol, ethanol and isopropanol, ketones such as acetone, methyl ethyl ketone, cyclohexanone and diacetone alcohol, amides such as N,N-dimethylformamide and N,N-dimethylacetamide, sulfoxides such as dimethylsulfoxide, ethers such as tetrahydrofuran, dioxane, ethylene glycol monomethyl ether, esters such as methyl acetate, ethyl acetate and butyl acetate, aliphatic halogenated hydrocarbons such as chloroform, methylene chloride, dichloroethylene, carbon tetrachloride and trichloroethylene, aromatics such as benzene, toluene, xylene, monochlorobenzene and dichlorobenzene, aliphatic hydrocarbons such as n-hexane cyclohexanoligroin, and fluorine containing solvents such as tetrafluoropropanol and pentafluoropropanol.

The infrared-absorptive compound of the present invention can be applied to heat insulating films and sunglasses, besides optical recording mediums.

As described above, the infrared-absorptive compound of the present invention has the following characteristics.

(1) It has a Wide absorption range in the infrared region and has a high absorbance coefficient (ε).

(2) It has a good solubility to general-purpose organic solvents.

The optical recording medium comprising the recording layer containing the infrared-absorptive compound of the present invention also has the following advantages.

(1) Recording-reproducing performance with a clear threshold value to a laser power can be obtained without lowering excellent properties such as the high reflectance and the high sensitivity inherent in organic coloring matters.

It has high stability to heat and light, as well as a superior long-term storage stability with less reproduction deterioration.

EXAMPLES

The present invention will be specifically described below by giving Examples. In the following, "part(s)" refers to "part(s) by weight".

Synthesis Example 1

In 600 parts of dimethylformamide, 0.5 mol (60 parts) of 2,5-diaminothiophene, 2.3 mol (360 parts) of p-nitrochlorobenzene, 1.2 mol (170 parts) of anhydrous potassium carbonate and 10 parts of copper powder were refluxed with stirring for 4 days. After the reaction was completed, the reaction mixture was filtered, and the residue was thoroughly washed with dimethylformamide, water and acetone, and then dried. Thus, 105 parts of reddish brown tetrakis(p-nitrophenyl)-2,5-diaminothiophene was obtained.

In an autoclave, 25 parts of the compound thus obtained was put together with 100 parts of dimethylformamide and 2 parts of palladium-carbon hydrogenated catalyst, and hydrogen gas was applied thereto at 5.0 $kg/cm^2$, followed by stirring at 90° C. to 100° C. until the absorption of hydrogen ceased.

After the reaction was completed, the reaction fluid was filtered, and the filtrate was poured into 350 parts of ice water. After stirring for a while, the precipitate was collected by filtration. This precipitate was recrystallized using an ethanol-dimethylformamide mixed solvent, to give 8 parts of tetrakis(p-aminophenyl)-2,5 diaminothiophene. On the compound thus obtained, purity was determined by high-speed liquid chromatography to reveal that it was in a purity of 96.6%.

Synthesis of Compound No.(I)-(A)-(5)

Together with 12 parts of dimethylformamide, 0.5 part of anhydrous sodium hydrogencarbonate and 3.0 parts of n-propyl bromide, 2 parts of the amino compound described above was heated and stirred at 100° C. to 130° C. After the reaction was carried out for 36 hours, the reaction fluid was poured into 100 parts of ice water, followed by extraction with ethyl acetate. The extract was dried and then purified using silica gel columns to give tetrakis(p-dipropylaminophenyl)-2,5-diaminothiophene in an amount of 1.5 parts. The compound thus obtained was subjected to infrared absorption analysis to confirm the extinction of absorption according to NH stretching vibration of amino groups.

In 20 parts of acetone, 1.0 part of this compound was dispersed, to which an equimolar amount of silver perchlorate was added with stirring. After the reaction was carried out at room temperature for 1 hour, the silver deposited was separated by filtration, and the filtrate was diluted with isopropyl ether. The diluted solution was left to stand, and the crystals deposited were collected by filtration to give the compound, No.(I)-(A)-(5), previously set out in an amount of 0.8 part.

The compound No.(I)-(A)-(5) thus obtained was a compound with a wide absorption range in the infrared region, having the maximum absorption wavelength of 1,005 nm and an absorbance coefficient of 63,000. In the present invention, the maximum absorption wavelength and the absorbance coefficient were measured using an autographic spectrophotometer U-3410, manufactured by Hitachi Ltd.

Synthesis of Compound No.(II)-(A)-(5)

In 16 parts of acetone, 1 part of the tetrakis(p-dipropylaminophenyl)-2,5-diaminothiophene used in the synthesis of compound No.(I)-(A)-(5) was dispersed, and to the dispersion 2-fold moles of silver perchlorate was added with stirring. After the reaction was carried out at room temperature for 1 hour, the silver deposite was separated by filtration, and the filtrate was diluted with isopropyl ether. The crystals deposited were collected by filtration to give the compound, No.-(II)-(A)-(5). This compound, No.(II)-(A)-(5) had the maximum absorption wavelength of 975 nm and the absorbance coefficient of 80,000.

In the examples described above, the anion is perchloric acid. When it is replaced with other anions, silver salts corresponding thereto may be used, whereby the intended compounds can be readily obtained. For example, silver salts such as $AgSbF_6$, $AgBF_4$, $AgSO_4$, $AgNO_3$, $AgSO_4C_6H_4CH_3$ and $AgAsF_6$ can be used. Besides, the desired compounds can also be obtained by electrolytic oxidation.

Synthesis Example 2

Reaction was carried out in the same manner as in Synthesis Example 1 except that the 2,5-diaminothiophene used therein was replaced with 2,5-diaminofuran, to give 20 parts of tetrakis(p-aminophenyl)-2,5-diaminofuran.

Synthesis of Compound No.(I)-(B)-(14)

Together with 25 parts of dimethylformamide, 1.1 parts of anhydrous sodium hydrogencarbonate and 4.2 parts of 2-methoxyethyl bromide, 3.8 parts of the tetrakis(p-aminophenyl)-2,5-diaminofuran thus obtained was heated and stirred at 100° C. to 130° C. After the reaction was carried out for 37 hours, the reaction fluid was poured into ice water, followed by extraction with ethyl acetate. The extract was dried and then purified using silica gel columns to give tetrakis(p-dimethoxyethylaminophenyl)-2,5-diaminofuran, which was obtained in an amount of 3.4 parts. The compound thus obtained was subjected to infrared absorption analysis to confirm the extinction of absorption according to NH stretching vibration of amino groups.

In 18 parts of acetone, 1 part of this compound was dispersed, to which an equimolar amount of silver hexafluoroantimonate was added with stirring. After the reaction was carried out at room temperature for 1 hour, the silver deposited was separated by filtration, and the filtrate was diluted with isopropyl ether. The dilute solution was left to stand, and the crystals deposited were collected by filtration to give the compound, No.(1)-(B)-(14), in an amount of 0.8 part. This was a compound having a wide absorption area in the infrared region, having a maximum absorption wavelength of 1,070 nm and the absorbance coefficient of 70,000.

Synthesis of Compound No.(II)-(B)-(4)

In 11 parts of acetone, 0.5 part of the tetrakis(p-dimethoxyethylaminophenyl)-2,5-diaminofuran obtained as an intermediate in the synthesis of the compound No.-(I)-(B)-(14) was dispersed with stirring, during which 2-fold mol of silver perchlorate was added at room temperature, followed by stirring for further 1 hour. After the reaction was completed, the silver salt deposite was separated by filtration, and the residue was thoroughly washed with acetone. The acetone was evaporated from the residue, followed by washing with water and then drying under reduced pressure to give the compound, No.(II)-(B)-(4), in an amount of 0.35 part. This was an infrared-absorptive compound having the maximum absorption peak at 981 nm and a absorbance coefficient of 101,000.

Examples in which the infrared-absorptive compound of the present invention is contained in optical recording mediums will be described below. The infrared-absorptive compounds used in the following Examples can be synthesized by the same methods as those shown in the Synthesis Examples 1 and 2 described above.

Example 1

On a polymethyl methacrylate (hereinafter "PMMA" substrate of 130 mm in diameter and 1.2 mm in thickness, a pregroove layer of an epoxy-acrylate type ultraviolet-curable resin was provided by the 2P process (photo-polymer process) to give 30 μm thickness. Then in 1,2-dichloroethane a polymethine dye IR-820 (available from Nippon Kayaku Co., Ltd) and the infrared-absorptive compound No.(I)-(A)-(5) previously described, in a weight ratio of 80:20 were dissolved and applied onto the surface by spin coating, followed by drying to give an optical recording medium of the present invention, having a recording layer with a thickness of 900 Å.

On the optical recording medium thus produced, C/N ratio (carrier-noise ratio) and reflectance were measured. Results of measurement are shown in Table 1.

The C/N ratio and reflectance were measured on each optical recording medium before (an initial state) and, after a repeated reproducing test, an environmental storage stability test and light-resistance stability test, except that after the repeated reproducing test only C/N ratio was measured. One recording medium was used for one test.

In the present invention, the C/N ratio is a value obtained by spectral analysis (scanning filter band width: 30 kHz) of reproduction waveform. In the measurement of this C/N ratio, information was written in the recording layer from the substrate side, using a semiconductor laser having an oscillation wavelength of 830 nm and a power of 8 mW. Recording frequency was set to 3 MHz, the information was written and read out in the state that the optical recording medium was fitted to a turntable rotating at 1,800 rpm. The written information was read out using a semiconductor laser having an oscillation wavelength of 830 nm and a power of 0.8 mW.

In the present invention, the reflectance is a relative value measured with the light of a wavelength of 830 nm, using the reflectance of aluminum as 100.

In the present invention, the repeated reproducing test was made by reading out of the recorded information $10^5$ times.

In the present invention, the environmental storage stability test was made by leaving information-recorded optical recording mediums in an environment of temperature 65° C. and humidity 85%RH for 2,000 hours.

In the present invention, light resisting stability test was made by irradiating information-recorded optical recording mediums with a xenon lamp (FAL-25AX-HC-B-Ec, manufactured by Suga Test Machine Co.) at 1,000 W/m² (300 to 900 nm) for 100 hours.

TABLE 1

| | (1) Reflectance (%) | (1) C/N (dB) | (2) C/N (dB) | (3) Reflectance (%) | (3) C/N (dB) | (4) Reflectance (%) | (4) C/N (dB) |
|---|---|---|---|---|---|---|---|
| Example: 1 | 25.8 | 57 | 55 | 24.0 | 55 | 23.2 | 54 |

(1): In initial state
(2): After repeated reproducing test (after $10^5$ times)
(3): After environmental storage stability test (65° C., 85% RH, after 2,000 hours)
(4): After light resisting stability test (xenon lamp, 1 kW/m², after 100 hours)

Examples 2 to 8

Seven kinds of optical recording mediums according to the present invention were produced in the same manner as in Example 1 except that the polymethine dye and the infrared-absorptive compound used therein were replaced with other polymethine dyes or azulenium dyes and infrared-absorptive compounds, in the combinations and weight ratios as shown in Table 2.

On the each optical recording mediums of Examples 2 to 8, the reflectance and C/N ratio were measured in the same manner as in Example 1. Results obtained are shown in Table 3.

Comparative Example 1

An optical recording medium with the same constitution as in Example 2 was produced in the same manner as in Example 1, except that no infrared-absorptive compound was contained.

On the optical recording medium thus produced, the reflectance and C/N ratio were measured in the same manner as in Example 1. Results obtained are shown in Table 3.

Comparative Example 2

An optical recording medium with the same constitution as in Example 5 was produced in the same manner as in Example 1, except that no infrared-absorptive compound was contained.

On the optical recording medium thus produced, the reflectance and C/N ratio were measured in the same manner as in Example 1. Results obtained are shown in Table 3.

TABLE 2

| Example: | Organic dye (α) | Infrared-absorptive compound (β) | Weight ratio (α:β) |
|---|---|---|---|
| 2 | Dye-1 | (I)-(B)-(8) | 85:15 |
| 3 | Dye-2 | (II)-(A)-(17) | 90:10 |
| 4 | Dye-3 | (I)-(D)-(10) | 75:25 |
| 5 | Dye-4 | (I)-(C)-(14) | 80:20 |
| 6 | Dye-5 | (II)-(D)-(19) | 70:30 |
| 7 | Dye-6 | (I)-(E)-(4)/ (II)-(E)-(4) | 80:10/10 |
| 8 | Dye-7 | (II)-(C)-(2) | 75:25 |

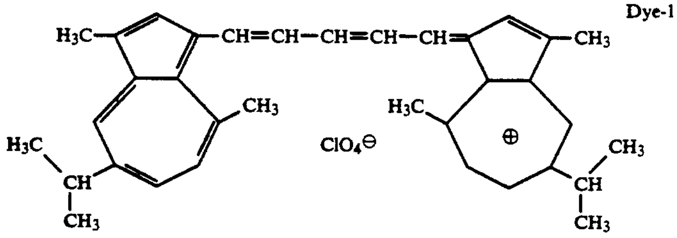
Dye-1
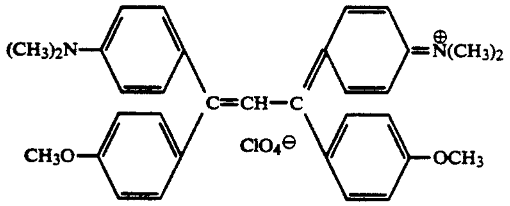
Dye-2
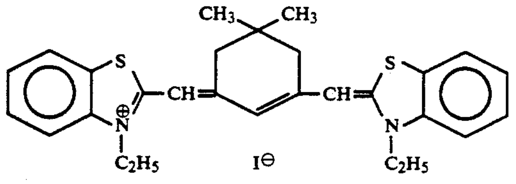
Dye-3
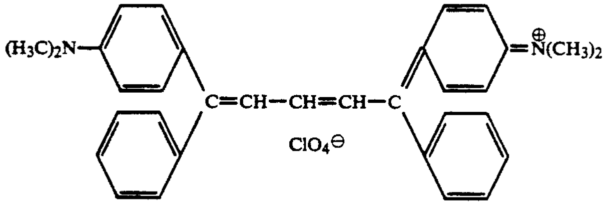
Dye-4
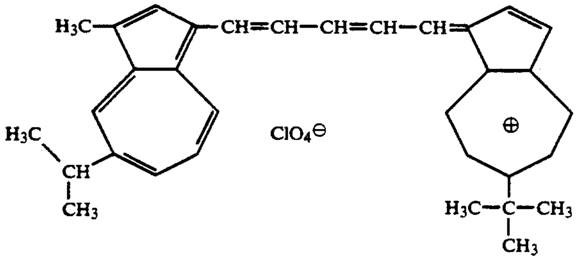
Dye-5
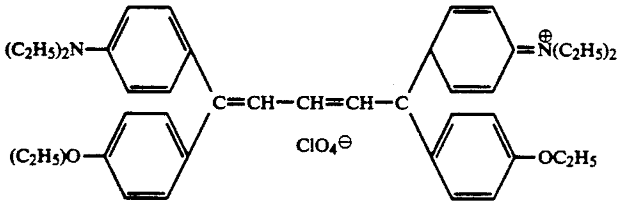
Dye-6
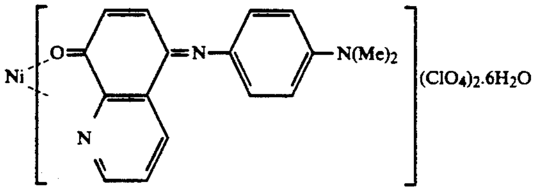
Dye-7

TABLE 3

| | (1) Reflectance (%) | (1) C/N (dB) | (2) C/N (dB) | (3) Reflectance (%) | (3) C/N (dB) | (4) Reflectance (%) | (4) C/N (dB) |
|---|---|---|---|---|---|---|---|
| Example: | | | | | | | |
| 2 | 27.5 | 56 | 54 | 25.2 | 54 | 23.8 | 52 |
| 3 | 27.2 | 54 | 51 | 25.1 | 52 | 24.1 | 51 |
| 4 | 33.0 | 51 | 49 | 24.1 | 49 | 22.7 | 47 |
| 5 | 26.1 | 55 | 53 | 23.9 | 54 | 22.0 | 51 |
| 6 | 25.9 | 53 | 51 | 23.8 | 52 | 21.9 | 49 |
| 7 | 25.2 | 53 | 49 | 23.0 | 50 | 21.3 | 49 |
| 8 | 24.9 | 45 | 40 | 22.1 | 39 | 20.0 | 39 |
| Comparative Example | | | | | | | |
| 1 | 27.7 | 57 | 39 | 17.1 | 42 | 13.8 | 35 |
| 2 | 26.4 | 56 | 37 | 18.2 | 41 | 13.1 | 32 |

(1): In initial state
(2): After repeated reproducing test (after $10^5$ times)
(3): After environmental storage stability test (65° C., 85% RH, after 2,000 hours)
(4): After light resisting stability test (xenon lamp, 1 kW/m², after 100 hours)

Examples 9 to 12

In 95 parts of diacetone alcohol, 4 parts of a mixture of the organic coloring matter and the infrared-absorptive compound in the combination and weight ratio as shown in Table 4 and 1 part of nitrocellulose resin (Ohaless Lacquer; available from Daicel Chemical Industries, Ltd.) were dissolved and applied on a polycarbonate substrate of 130 mm in diameter and 1.2 mm in thickness by spin coating to give dried coating thickness of 950 Å. Thus, four kinds of optical recording mediums of the present invention were produced.

On the respective optical recording mediums thus produced, the reflectance and C/N ratio were measured in the same manner as in Example 1. Results obtained are shown in Table 5.

TABLE 4

| Example: | Organic dye (α) | Infrared-absorptive compound (β) | Weight ratio (α:β) |
|---|---|---|---|
| 9 | Dye-8 | (II)-(A)-(16) | 80:20 |
| 10 | Dye-9 | (I)-(D)-(7) | 90:10 |
| 11 | Dye-10 | (II)-(C)-(9) | 70:30 |
| 12 | Dye-11 | (I)-(B)-(10) | 85:15 |

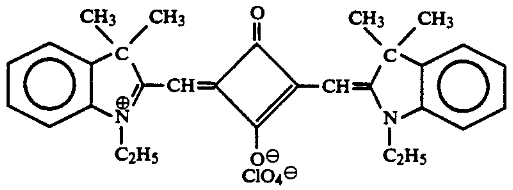

Dye-8

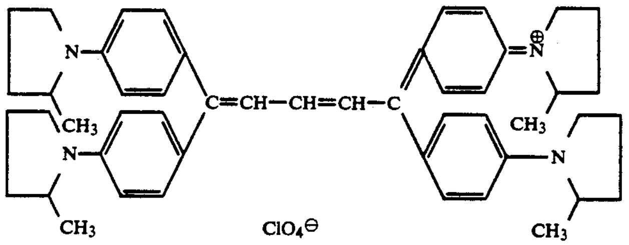

Dye-9

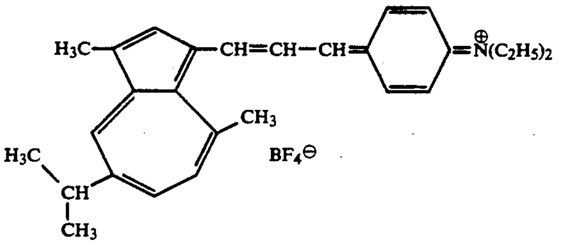

Dye-10

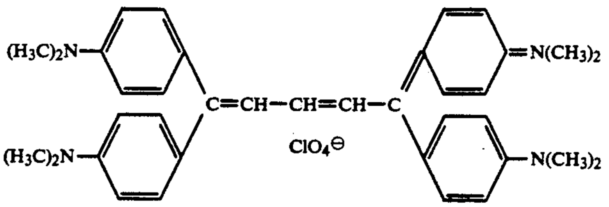

Dye-11

TABLE 5

| Example: | (1) Reflectance (%) | (1) C/N (dB) | (2) C/N (dB) | (3) Reflectance (%) | (3) C/N (dB) | (4) Reflectance (%) | (4) C/N (dB) |
|---|---|---|---|---|---|---|---|
| 9 | 26.8 | 52 | 50 | 24.3 | 48 | 22.9 | 47 |
| 10 | 26.2 | 54 | 51 | 23.9 | 51 | 22.1 | 48 |
| 11 | 25.5 | 50 | 48 | 23.1 | 49 | 23.0 | 48 |

TABLE 5-continued

| Example: | (1) Reflectance (%) | (1) C/N (dB) | (2) C/N (dB) | (3) Reflectance (%) | (3) C/N (dB) | (4) Reflectance (%) | (4) C/N (dB) |
|---|---|---|---|---|---|---|---|
| 12 | 26.1 | 53 | 51 | 23.1 | 48 | 22.7 | 48 |

(1): In initial state
(2): After repeated reproducing test (after $10^5$ times)
(3): After environmental storage stability test (65° C., 85% RH, after 2,000 hours)
(4): After light resisting stability test (xenon lamp, 1 kW/$m^2$, after 100 hours)

Examples 13 to 16

On a polycarbonate (hereinafter "PC") substrate of wallet size and 0.4 thickness, pregrooves were provided by hot pressing, and a mixture containing an organic coloring matter and an infrared-absorptive compound in the combination and weight ratio as shown in Table 6 was applied thereon by bar coating, followed by drying to form a recording layer of 900 Å in thickness. To this recording layer, another PC substrate of wallet size and 0.3 mm thickness was laminated by hot rolling, interposing an ethylene-vinyl acetate dry film between them. Thus, four kinds of optical recording mediums of bonded laminate structure were produced.

On the four kinds of wallet size optical recording mediums thus produced, contrast ratio and reflectance were measured. Results of measurement are shown in Table 7.

The contrast ratio and reflectance were measured on optical recording mediums separately used for each measurement made in an initial state, after an environmental storage stability test and after light resisting stability test.

In the present invention, the contrast ratio is a value obtained when the information written in the recording layer is read out using semiconductor laser having an oscillation wavelength of 830 nm and a power of 0.2 mW and the signal intensity is calculated according to the following expression.

$$\text{Contrast ratio} = (A - B)/A$$

wherein A represents a signal intensity at the unrecorded area and B represents a signal intensity at the recorded area.

In the measurement of this contrast ratio, information was written in the recording layer from the substrate side, using a semiconduotor laser having oscillation wavelength of 830 nm and a power of 3.5 mW. Recording pulse was set to 50 μsec. The information was written and read out in the state that the optical recording medium was set on a stage driving in the X-Y direction.

Comparative Example 3

An optical recording medium with the same constitution as in Example 13 was produced in the same manner as in Example 13, except that no infrared-absorptive compound was contained.

On the optical recording medium thus produced, the reflectance and contrast ratio were measured in the same manner as in Example 13. Results obtained are shown in Table 7.

Comparative Example 4

An optical recording medium with the same constitution as in Example 16 was produced in the same manner as in Example 13, except that no infrared-absorptive compound was contained.

On the optical recording medium thus produced, the reflectance and contrast ratio were measured in the same manner as in Example 13. Results obtained are shown in Table 7.

TABLE 6

| Example: | Organic dye (α) | Infrared-absorptive compound (β) | Weight ratio (α:β) |
|---|---|---|---|
| 13 | IR-820* | (I)-(D)-(16) | 75:25 |
| 14 | Dye-12 | (II)-(A)-(10) | 80:20 |
| 15 | Dye-13 | (I)-(C)-(8) | 70:30 |
| 16 | Dye-14 | (II)-(E)-(12) | 90:10 |
| 17 | Dye-15 | (I)-(B)-(7)/ (I)-(A)-(22) | 85:10/5 |

*Available from Nippon Kayaku Co., Ltd.

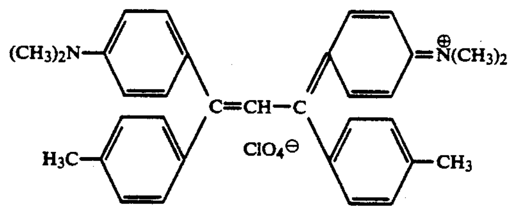

Dye-12

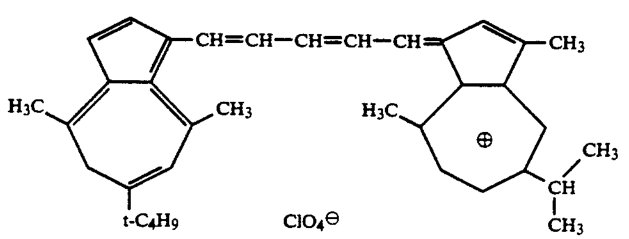

Dye-13

-continued

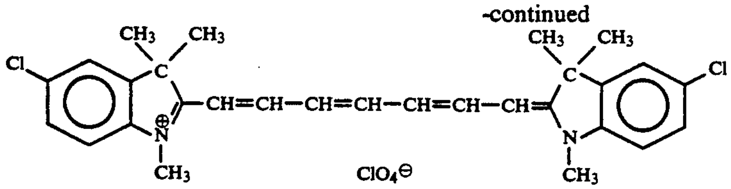

Dye-14

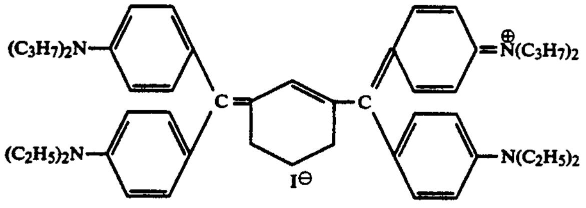

Dye-15

TABLE 7

| | (1) | | (2) | | (3) | |
|---|---|---|---|---|---|---|
| | Reflectance (%) | contrast ratio | Reflectance (%) | contrast ratio | Reflectance (%) | contrast ratio |
| Example: | | | | | | |
| 13 | 14.8 | 0.65 | 13.5 | 0.61 | 12.6 | 0.58 |
| 14 | 15.4 | 0.61 | 13.7 | 0.56 | 12.2 | 0.54 |
| 15 | 15.1 | 0.63 | 13.3 | 0.59 | 12.9 | 0.57 |
| 16 | 16.0 | 0.66 | 12.1 | 0.52 | 11.8 | 0.52 |
| 17 | 15.5 | 0.61 | 13.3 | 0.57 | 12.1 | 0.53 |
| Comparative Example: | | | | | | |
| 3 | 14.9 | 0.66 | 11.8 | 0.53 | 10.8 | 0.49 |
| 4 | 16.2 | 0.67 | 10.8 | 0.50 | 10.5 | 0.42 |

(1): In initial state
(2): After environmental storage stability test (65° C., 85% RH, after 2,000 hours)
(3): After light resisting stability test (xenon lamp, 1 kW/$m^2$, after 100 hours)

What is claimed is:

1. An optical recording medium comprising a substrate and a recording layer, said recording layer containing (i) an organic color matter and (ii) at least one infrared-absorptive compound represented by the formula (I) and (II):

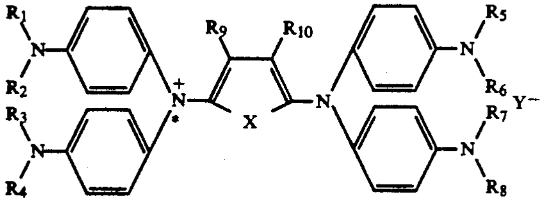

(I)

-continued

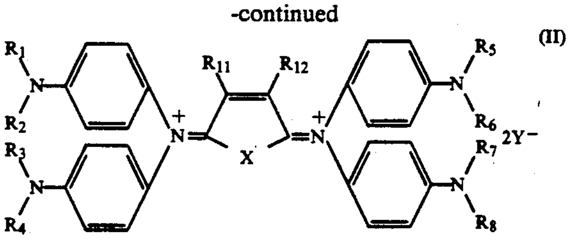

(II)

wherein $R_1$, $R_2$, $R_3$, $R_4$, $R_5$, $R_6$, $R_7$ and $R_8$ are each independently selected from a hydrogen atom or a monovalent organic residual group; $R_1$ and $R_2$, $R_3$ and $R_4$, $R_5$ and $R_6$, and $R_7$ and $R_8$ may each combine to form a 5-membered, 6-membered or 7-membered ring; $R_9$, $R_{10}$, $R_{11}$ and $R_{12}$ are each independently selected from a hydrogen atom, an alkyl group, an alkoxyl group, a halogen atom, a hydroxyl group or a cyano group; X represents a sulfur atom, an oxygen atom, a selenium atom, a tellurium atom or $NR_{13}$ wherein N represents a nitrogen atom and $R_{13}$ represents a hydrogen atom or a monovalent organic group; and Y represents an anion.

2. The optical recording medium according to claim 1, wherein said recording layer contains a binder.

3. The optical recording medium according to claim 1, wherein said recording layer contains said organic coloring matter in an amount of from 40% by weight to 99% by weight, and said infrared-absorptive compound in an amount of from 1% by weight to 60% by weight.

4. The optical recording medium according to claim 3, wherein said infrared-absorptive compound is contained in an amount of from 5% to 40% by weight based on the total weight of the recording layer.

5. The optical recording medium according to claim 1, wherein said recording layer is provided thereon with a protective layer.

6. The optical recording medium according to claim 14, wherein a snubbing layer is provided between said substrate and said recording layer.

* * * * *

UNITED STATES PATENT AND TRADEMARK OFFICE

CERTIFICATE OF CORRECTION

PATENT NO. : 5,275,925

DATED : January 4, 1994

INVENTOR(S) : CHIEKO MIHARA, ET AL.

It is certified that error appears in the above-indentified patent and that said Letters Patent is hereby corrected as shown below:

COLUMN 2

Line 43, "$R_2R_3$" should read --$R_2$, $R_3$--.

COLUMN 4

Line 10, "one" should read --from one--.

COLUMN 7

At Compound No. [I]-(A)-(7), "$C_3H_6OC_3H_7, C_3H_6OC_2H_7$" (all occurrences) should read --$C_3H_6OC_3H_7, C_3H_6OC_3H_7$--.

At Compound No. [I]-(A)-(9), "$C_3H_4CH=CH_2, C_3H_4CH=CH_2$" (all occurrences) should read --$C_2H_4CH=CH_2, C_2H_4CH=CH_2$--.

COLUMN 11

At Compound No. [I]-(A)-(20), "$SbF_2$" should read --$SbF_6$--; and "$CH=C(CH_2)CH_2C(CH_2)_2CH_2$" (all occurrences) should read --$CH=C(CH_3)CH_2C(CH_3)_2CH_2$--.

At Compound No. [I]-(A)-(21), "$n-C_2H_7, n-C_3H_7$" (all occurrences) should read --$n-C_3H_7, n-C_3H_7$--.

At Compound No. [I]-(A)-(26), "$C_2H_4C{\equiv}CH_1C_2H_4C{\equiv}CH$" (all occurrences) should read --$C_2H_4C{\equiv}CH, C_2H_4C{\equiv}CH$--.

At Compound No. [I]-(A)-(27), "$C_2H_5C{\equiv}CH, C_3H_6C{\equiv}CH$" (all occurrences) should read --$C_3H_6C{\equiv}CH, C_3H_6C{\equiv}CH$--.

COLUMN 13

At Compound No. [I]-(A)-(28), "$n-C_3H_6, n-C_2H_7$" (all occurrences) should read --$n-C_3H_7, n-C_3H_7$--.

At Compound No. [I]-(A)-(34), "$CH=C(CH_2)CH_2C(CH_2)_2CH_2$" (all occurrences) should read --$CH=C(CH_3)CH_2C(CH_3)_2CH_2$--.

UNITED STATES PATENT AND TRADEMARK OFFICE
CERTIFICATE OF CORRECTION

PATENT NO. : 5,275,925
DATED : January 4, 1994
INVENTOR(S) : CHIEKO MIHARA, ET AL.

It is certified that error appears in the above-indentified patent and that said Letters Patent is hereby corrected as shown below:

COLUMN 13 (cont'd.)

At Compound No. [I]-(A)-(35), "SbF$_3$" should read --SbF$_6$--; "C$_2$H$_4$OCH$_3$,C$_2$H$_4$OCH$_3$" (both occurrences) should read --C$_3$H$_4$OCH$_3$,C$_3$H$_4$OCH$_3$--; and "C$_2$H$_6$,C$_2$H$_6$" (both occurrences) should read --C$_2$H$_5$,C$_2$H$_5$--.

COLUMN 15

At Compound No. [I]-(B)-(2), "C$_2$H$_6$,C$_2$H$_6$" (all occurrences) should read --C$_2$H$_5$,C$_2$H$_5$--.
At Compound No. [I]-(B)-(5), "n-C$_2$H$_7$,n-C$_3$H$_7$" (all occurrences) should read --n-C$_3$H$_7$,n-C$_3$H$_7$--.
At Compound No. [I]-(B)-(6), "iso-C$_2$H$_7$,iso-C$_2$H$_7$" (all occurrences) should read --iso-C$_3$H$_7$,iso-C$_3$H$_7$--.

COLUMN 17

At Compound No. [I]-(B)-(11), "n-C$_{12}$H$_{26}$,n-C$_{12}$H$_{26}$" (all occurrences) should read --n-C$_{12}$H$_{25}$,n-C$_{12}$H$_{25}$--.
At Compound No. [I]-(B)-(12), "C$_2$H$_4$CH=CH$_2$,C$_2$H$_4$CH=CH$_2$" (all occurrences) should read --C$_3$H$_6$CH=CH$_2$,C$_3$H$_6$CH=CH$_2$--.

COLUMN 19

At Compound No. [I]-(B)-(20), "CH=C(CH$_2$)CH$_2$C(CH$_2$)$_2$CH$_2$" (all occurrences) should read --CH=C(CH$_3$)CH$_2$C(CH$_3$)$_2$CH$_2$--.
At Compound No. [I]-(B)-(21), "C$_2$H$_5$C=CH$_2$,C$_2$H$_5$C=CH$_2$" (all occurrences) should read --C$_3$H$_6$C=CH$_2$,C$_3$H$_6$C=CH$_2$--.
At Compound No. [I]-(B)-(24), "n-C$_5$H$_{11}$,n-C$_4$H$_{11}$" (all occurrences) should read --n-C$_5$H$_{11}$,n-C$_5$H$_{11}$--.
At Compound No. [I]-(B)-(25), "SbF$_4$" should read --SbF$_6$--.
At Compound No. [I]-(B)-(28), "SbF$_4$" should read --SbF$_6$--.

UNITED STATES PATENT AND TRADEMARK OFFICE
CERTIFICATE OF CORRECTION

PATENT NO. : 5,275,925

DATED : January 4, 1994

INVENTOR(S) : CHIEKO MIHARA, ET AL.

It is certified that error appears in the above-indentified patent and that said Letters Patent is hereby corrected as shown below:

COLUMN 21

At Compound No. [I]-(C)-(1), "$CH=C(CH_3)CH_2C(CH_2)_2CH_2$" (all occurrences) should read --$CH=C(CH_3)CH_2C(CH_3)_2CH_2$--.

At Compound No. [I]-(C)-(2), "n-$C_3H_7$,n-$C_4H_7$" (both occurrences) should read --n-$C_3H_7$,n-$C_3H_7$--.

COLUMN 25

At Compound No. [I]-(C)-(16), "$CH_2SO_4$" should read --$CH_3SO_4$--.

At Compound No. [I]-(C)-(18), "$A_5F_6$" should read --$AsF_6$--.

COLUMN 27

At Compound No. [I]-(C)-(23), "$SbF_5$" should read --$SbF_6$--.

COLUMN 29

At Compound No. [I]-(C)-(33), "$C_2H_4Cl$,$C_2H_4Cl$" (first occurrence) should read --$C_3H_6Cl$,$C_3H_6Cl$--.

At Compound No. [I]-(C)-(34), "$CH=C(CH_3)CH_2C(CH_2)_2CH_2$" (all occurrences) should read --$CH=C(CH_3)CH_2C(CH_3)_2CH_2$--.

COLUMN 31

At Compound No. [I]-(C)-(35), "$SbF_4$" should read --$SbF_6$--.

At Compound No. [I]-(D)-(2), "$C_3H_4OCH_3$,$C_3H_4OCH_3$" (all occurrences) should read --$C_2H_4OCH_3$,$C_2H_4OCH_3$--.

At Compound No. [I]-(D)-(3), "$C_3H_6OC_3H_5$,$C_3H_6OC_3H_5$" (all occurrences) should read --$C_3H_6OC_2H_5$,$C_3H_6OC_2H_5$--.

UNITED STATES PATENT AND TRADEMARK OFFICE

CERTIFICATE OF CORRECTION

PATENT NO. : 5,275,925

DATED : January 4, 1994

INVENTOR(S) : CHIEKO MIHARA, ET AL.

It is certified that error appears in the above-indentified patent and that said Letters Patent is hereby corrected as shown below:

COLUMN 33

At Compound No. [I]-(D)-(9), "$C_2H_4$=$CH_2$,$C_2H_4$CH=$CH_2$" (all occurrences) should read --$C_2H_4$CH=$CH_2$,$C_2H_4$CH=$CH_2$--.

At Compound No. [I]-(D)-(11), "CH=C($CH_2$)$CH_2$C($CH_2$)$_2$$CH_2$" (all occurrences) should read --CH=C($CH_3$)$CH_2$C($CH_3$)$_2$$CH_2$--.

At Compound No. [I]-(D)-(12), "n-$C_3H_7$,n-$C_3H_7$" (last two occurrences) should read --n-$C_5H_{11}$,n-$C_5H_{11}$--.

At Compound No. [I]-(D)-(14), "$C_3H_5$,$C_3H_7$" (all occurrences) should read --$C_2H_5$,$C_3H_7$--.

At Compound No. [I]-(D)-(15), "n-$C_4H_{11}$,n-$C_5H_{11}$" (all occurrences) should read --n-$C_5H_{11}$,n-$C_5H_{11}$--.

At Compound No. [I]-(D)-(17), "$C_3H_4$C≡CH,$C_2H_4$C≡CH" (all occurrences) should read --$C_2H_4$C≡CH,$C_2H_4$C≡CH--.

COLUMN 35

At Compound No. [I]-(D)-(18), "$C_3H_5$C≡CH,$C_3H_5$C≡CH" (first and third occurrences) should read --$C_3H_6$C≡CH,$C_3H_6$C≡CH--.

At Compound No. [I]-(E)-(1), "[I]-(E)-(1)" should read --[I]-(D)-(19)--.

At Compound No. [I]-(E)-(2), "[I]-(E)-(2)" should read --[I]-(E)-(1)--.

At Compound No. [I]-(E)-(3), "[I]-(E)-(3)" should read --[I]-(E)-(2)--; and insert --¶ [I]-(E)-(3) - 

- $ClO_4$ $C_2H_4OC_2H_5$, $C_2H_4OCH_5$ $C_2H_4OC_2H_5$, $C_2H_4OCH_5$ $C_2H_4OC_2H_5$, $C_2H_4OCH_5$ $C_2H_4OC_2H_5$, $C_2H_4OCH_5$--.

COLUMN 37

At Compound No. [I]-(E)-(11), "$AsF_5$" should read --$AsF_6$--.

At Compound No. [I]-(E)-(15), "CH=C($CH_2$)$CH_2$C($CH_2$)$_2$$CH_2$" (all occurrences) should read --CH=C($CH_3$)$CH_2$C($CH_3$)$_2$$CH_2$--.

UNITED STATES PATENT AND TRADEMARK OFFICE

CERTIFICATE OF CORRECTION

PATENT NO. : 5,275,925

DATED : January 4, 1994

INVENTOR(S) : CHIEKO MIHARA, ET AL.

It is certified that error appears in the above-indentified patent and that said Letters Patent is hereby corrected as shown below:

COLUMN 39

At Compound No. [II]-(A)-(9), "$AsF_5$" should read --$AsF_6$--.

COLUMN 41

At Compound No. [II]-(A)-(16), "$CH{=}C(CH_2)CH_2C(CH_2)_2CH_2$" (all occurrences) should read --$CH{=}C(CH_3)CH_2C(CH_3)_2CH_2$--.

COLUMN 43

At Compound No. [II]-(B)-(2), "$C_2H_4CH{=}CH_2, C_2H_4CH{=}CH_2$" (first two occurrences) should read --$C_3H_6CH{=}CH_2, C_3H_6CH{=}CH_2$--.

At Compound No. [II]-(B)-(5), "n-$C_4H_9$,n-$C_4H_9$" (second and fourth occurrences) should read --n-$C_3H_7$,n-$C_3H_7$--.

COLUMN 45

At Compound No. [II]-(B)-(10), "$CH{=}C(CH_2)CH_2C(CH_2)_2CH_2$" (all occurrences) should read --$CH{=}C(CH_3)CH_2C(CH_3)_2CH_2$--.

At Compound No. [II]-(B)-(14), "n-$C_4H_{11}$,n-$C_5H_{11}$" (all occurrences) should read --n-$C_5H_{11}$,n-$C_5H_{11}$--.

COLUMN 47

At Compound No. [II]-(C)-(3), "$SbF_4$" should read --$SbF_6$--.

COLUMN 49

At Compound No. [II]-(C)-(9), "$A_5F_8$" should read --$AsF_6$--.

COLUMN 51

At Compound No. [II]-(C)-(19), "$AsF_5$" should read --$AsF_6$--.

UNITED STATES PATENT AND TRADEMARK OFFICE

CERTIFICATE OF CORRECTION

PATENT NO. : 5,275,925

DATED : January 4, 1994

INVENTOR(S) : CHIEKO MIHARA, ET AL.

It is certified that error appears in the above-indentified patent and that said Letters Patent is hereby corrected as shown below:

COLUMN 53

At Compound No. [II]-(D)-(7), "$CH_2SO_4$" should read --$CH_3SO_4$--.

At Compound No. [II]-(D)-(11), "$CH=C(CH_2)CH_2C(CH_2)_2CH_2$" (all occurrences) should read --$CH=C(CH_3)CH_2C(CH_3)_2CH_2$--.

COLUMN 55

At Compound No. [II]-(D)-(18), "$C_2H_6C\equiv CH, C_2H_6C\equiv CH$" (all occurrences) should read --$C_3H_6C\equiv CH, C_3H_6C\equiv CH$--.

COLUMN 57

At Compound No. [II]-(E)-(5), "$C_2H_6OC_2H_5, C_3H_6OC_2H_5$" (both occurrences) should read --$C_3H_6OC_2H_5, C_3H_6OC_2H_5$--.

COLUMN 59

At Compound No. [II]-(E)-(15), "$CH=C(CH_2)CH_2C(CH_2)_2CH_2$" (all occurrences) should read --$CH=C(CH_3)CH_2C(CH_3)_2CH_2$--.

COLUMN 61

Line 7, "into" should read --in--.

Line 21, "pits are" should read --pits formed on the recording layer 2 are--.

Line 24, "energy" should read --energy.--.

CERTIFICATE OF CORRECTION

PATENT NO. : 5,275,925

DATED : January 4, 1994

INVENTOR(S) : CHIEKO MIHARA, ET AL.

It is certified that error appears in the above-indentified patent and that said Letters Patent is hereby corrected as shown below:

COLUMN 62

Line 1, "Dye" should read --¶ Dye--.

At Formula IV, "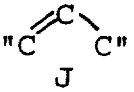" should read --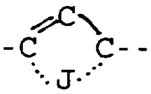--.

At Formula V, "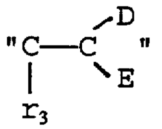" should read --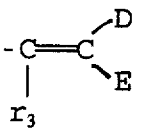--.

At Formula VII, "⊕" should read -- 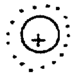 --.

COLUMN 63

At Formula VIII, "⊕" should read --  --.

At Formula IX, "⊕" should read --  --.

Line 35, "members" should read --member--

Line 40, "pyrrol" should read --pyrrole--; and "rhiophene" should read --thiophene--.

Line 42, "G" should be deleted.

Line 63, "⊕" should read -- 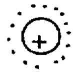 --.

UNITED STATES PATENT AND TRADEMARK OFFICE
CERTIFICATE OF CORRECTION

PATENT NO. : 5,275,925
DATED : January 4, 1994
INVENTOR(S) : CHIEKO MIHARA, ET AL.

It is certified that error appears in the above-indentified patent and that said Letters Patent is hereby corrected as shown below:

COLUMN 64

At Formula (4), "$\oplus$" should read --  --.

At Formula (5), "$\oplus$" should read --  --.

At Formula (6), " 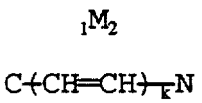 " should read -- 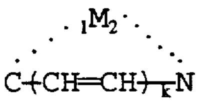 --.

COLUMN 65

At Formula (7), " 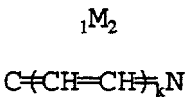 " should read -- 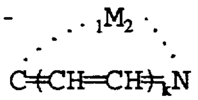 --.

At Formula (11), " 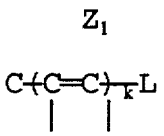 " should read -- 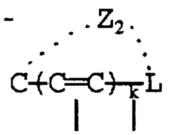 --.

At Formula (11) (second occurrence), "(11)" should read --(12)--.

COLUMN 66

At Formula XI, " 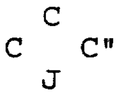 " should read -- 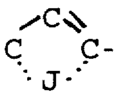 --.

At Formula XII, "---$_2M_2$---" should read -- ---$_1M_2$--- --.
Line 33, "Formula (XIII" should read --Formula (XIII)--.
Line 60, "$r_1$," should read --r',--.

UNITED STATES PATENT AND TRADEMARK OFFICE

CERTIFICATE OF CORRECTION

PATENT NO. : 5,275,925

DATED : January 4, 1994

INVENTOR(S) : CHIEKO MIHARA, ET AL.

It is certified that error appears in the above-indentified patent and that said Letters Patent is hereby corrected as shown below:

COLUMN 67

Line 2, "group)." should read --group),--.
Line 3, "for" should read --(for--.
Line 10, "N-(methylsuIfonyl)-" should read --N-(methylsulfonyl)- --.
Line 46, "group" should read --group,--.

COLUMN 68

Line 23, "n-octyl" should read --n-octyl,--.

COLUMN 69

Line 15, "carboxypropyl," should read --carboxypropyl),--.
Line 18, "α-naphtylmethyl" should read --α-naphthylmethyl--; and "β-naphtylmethyl" should read --β-naphthylmethyl--.
Line 32, "rophenyl" should read --rophenyl,--.

COLUMN 70

Line 2, "naththoxazole" should read --naphthoxazole--.

COLUMN 72

Line 19, "Wide" should read --wide--.

COLUMN 73

Line 48, "deposite" should read --deposit--.

COLUMN 74

Line 29, "No.(1)-" should read --No.(I)- --.
Line 63, ""PMMA"" should read --"PMMA")--.

COLUMN 76

Line 25, "each" should be deleted.

UNITED STATES PATENT AND TRADEMARK OFFICE

CERTIFICATE OF CORRECTION

PATENT NO. : 5,275,925

DATED : January 4, 1994

INVENTOR(S) : CHIEKO MIHARA, ET AL.

It is certified that error appears in the above-indentified patent and that said Letters Patent is hereby corrected as shown below:

COLUMN 77

At Dye-1, "⊕" should read --  --.

At Dye-5, "⊕" should read --  --.

COLUMN 82

At Dye-13, "⊕" should read --  --.

COLUMN 83

Line 48, "mula" should read --mulae--.

COLUMN 84

Line 37, "$NR_{13}$" should read --$NR_{13}$,--.

Line 57, "14," should read --1,--; and "snubbing" should read --subbing--.

Signed and Sealed this

Third Day of January, 1995

Attest:

BRUCE LEHMAN

*Attesting Officer*

*Commissioner of Patents and Trademarks*